(12) United States Patent
Sasaki et al.

(10) Patent No.: US 6,323,302 B1
(45) Date of Patent: Nov. 27, 2001

(54) CARBONIC ACID DIESTER, AROMATIC POLYCARBONATE AND FACILITIES, AND PREPARATION THEREOF

(75) Inventors: Katsushi Sasaki; Wataru Funakoshi; Toru Sawaki; Masumi Hirata; Hiroaki Kaneko; Masanori Abe; Masasi Simonaru; Hidemi Takemoto; Jyuhou Matsuo; Yoshiki Matsuoka, all of Yamaguchi (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/445,824
(22) PCT Filed: Apr. 22, 1999
(86) PCT No.: PCT/JP99/02141
§ 371 Date: Dec. 14, 1999
§ 102(e) Date: Dec. 14, 1999
(87) PCT Pub. No.: WO99/55764
PCT Pub. Date: Nov. 4, 1999

(30) Foreign Application Priority Data

| Apr. 27, 1998 | (JP) | 10-116864 |
|---|---|---|
| Jul. 16, 1998 | (JP) | 10-201695 |
| Sep. 14, 1998 | (JP) | 10-260102 |
| Sep. 14, 1998 | (JP) | 10-260103 |
| Sep. 22, 1998 | (JP) | 10-268231 |
| Feb. 26, 1999 | (JP) | 11-050174 |

(51) Int. Cl.$^7$ .................................................. C08G 64/00
(52) U.S. Cl. ................................... 528/196; 528/198
(58) Field of Search .......................... 528/196, 198

(56) References Cited

U.S. PATENT DOCUMENTS

| 4,383,092 | 5/1983 | Ko et al. . | |
| 5,276,129 | 1/1994 | Sakashita et al. | 528/198 |
| 5,399,659 | 3/1995 | Kühling et al. | 528/199 |
| 5,444,148 | 8/1995 | Alewelt et al. . | |
| 5,455,324 | 10/1995 | Nukui et al. . | |
| 5,466,775 | 11/1995 | Kanno et al. | 528/199 |
| 5,495,038 | 2/1996 | Buysch et al. | 558/274 |
| 5,516,878 | 5/1996 | Sasaki et al. . | |
| 5,519,106 | 5/1996 | Nukui et al. | 528/199 |
| 5,525,701 | 6/1996 | Tominari et al. | 528/198 |
| 5,527,875 | 6/1996 | Yokoyama et al. . | |
| 5,548,041 | 8/1996 | Yamato et al. | 526/62 |
| 5,578,694 | 11/1996 | Yokoyama et al. . | |
| 5,717,057 | 2/1998 | Sakashita et al. | 528/196 |
| 5,739,258 | 4/1998 | Zaby et al. | 528/198 |
| 5,929,192 | 7/1999 | Miyauli et al. . | |

FOREIGN PATENT DOCUMENTS 0 400 732 9   1/1992 (EP) .

(List continued on next page.)

Primary Examiner—Terressa M. Boykin
(74) Attorney, Agent, or Firm—Sughrue, Mion, Zinn, Macpeak & Seas, PLLC

(57) ABSTRACT

Aromatic polycarbonate having a reduced discoloration and improved heat stability, hue, etc. is provided by keeping a pressure in a raw material melting vessel and the linear velocity of a gas in a transporting piping in a specific range, keeping the concentration of a nitrogen-containing basic compound in a specific range, recycling a byproduct containing specific amounts of impurities, suppressing the amounts of a nitrogen-containing basic compound, metallic elements and a silicic acid derivative in the carbonic acid diester at specific values or less, prescribing the material quality of the reaction facilities, and/or forming an oxide layer at the inner wall surfaces of the reaction facilities.

32 Claims, 1 Drawing Sheet

FOREIGN PATENT DOCUMENTS

| | | |
|---|---|---|
| 0 512 223 A1 | 11/1992 | (EP) . |
| 529 093 | 3/1993 | (EP) . |
| 0 577 849 A1 | 1/1994 | (EP) . |
| 0 608 778 A2 | 8/1994 | (EP) . |
| 0 622 418 A2 | 11/1994 | (EP) . |
| 629 646 | 12/1994 | (EP) . |
| 0 633 241 A1 | 1/1995 | (EP) . |
| 0 702 583 0 | 1/1995 | (EP) . |
| 0 667 366 A2 | 8/1995 | (EP) . |
| 0 719 816 A2 | 7/1996 | (EP) . |
| 0 745 580 A1 | 12/1996 | (EP) . |
| 0 764 673 A2 | 3/1997 | (EP) . |
| 0 779 312 A2 | 6/1997 | (EP) . |
| 0 819 717 A1 | 1/1998 | (EP) . |
| 61-087724 | 5/1986 | (JP) . |
| 61-087725 | 5/1986 | (JP) . |
| 4-007328 | 1/1992 | (JP) . |
| 4-007329 | 1/1992 | (JP) . |
| 5-239334 | 9/1993 | (JP) . |
| 6-049197 | 2/1994 | (JP) . |
| 6-056984 | 3/1994 | (JP) . |
| 6-065367 | 3/1994 | (JP) . |
| 6-200008 | 7/1994 | (JP) . |
| 6-234845 | 8/1994 | (JP) . |
| 6-345860 | 12/1994 | (JP) . |
| 7-070307 | 3/1995 | (JP) . |
| 7-188116 | 7/1995 | (JP) . |
| 7-268091 | 10/1995 | (JP) . |
| 08-005957 | 1/1996 | (JP) . |
| 8-059975 | 3/1996 | (JP) . |
| 9-241370 | 9/1997 | (JP) . |
| 10-036497 | 2/1998 | (JP) . |
| 10-226723 | 8/1998 | (JP) . |
| 4-106125 | 4/1992 | (JP) ............... C08G/64/30 |
| 4-142329 | 5/1992 | (JP) ............... C08G/64/30 |
| 6-49197 | 2/1994 | (JP) ............... C08G/64/30 |
| 6-65367 | 3/1994 | (JP) ............... C08G/64/30 |
| 6-179744 | 6/1994 | (JP) ............... C08G/64/30 |
| 7-70307 | 3/1995 | (JP) ............... C08G/64/30 |
| 8-277327 | 10/1996 | (JP) ............... C08G/64/30 |
| 9-255772 | 9/1997 | (JP) ............... C08G/64/30 |

CARBONIC ACID DIESTER, AROMATIC POLYCARBONATE AND FACILITIES, AND PREPARATION THEREOF

FIELD OF THE INVENTION

Some of the present invention relates to a method for producing an aromatic polycarbonate, more particularly relates to a method for stably and economically producing an aromatic polycarbonate having a good quality by a melt polycondensation reactions Further, some other part of the present invention relates to a method for producing an aromatic polycarbonate excellent in heat stability and hue.

Further, some other part of the present invention relates to a method for producing an aromatic polycarbonate by recycling a monohydroxy compound produced as a byproduct from the said melt polycondensation reaction and using as a solvent for a catalyst in producing the aromatic polycarbonate by the melt polycondensation reaction.

Further, some other part of the present invention relates to the production of a carbonic diester as a raw material for the production of an aromatic polycarbonate and of an aromatic polycarbonate produced therefrom, more particularly, to the carbonic acid diester good in storing stability, and an aromatic polycarbonate having an improved quality and color tone, which is produced from the said carbonic acid diester.

Further, some other part of the present invention relates to a method for producing a polycarbonate, more particularly to a method for producing an aromatic polycarbonate, the generation of foreign materials being suppressed, by using reaction facilities composed of a stainless alloy containing a specific amount of a specific metal in producing the aromatic polycarbonate by an ester interchange reaction of a dihydroxy compound with a carbonic acid diester compound.

Further, some other part of the present invention relates to facilities for producing an aromatic polycarbonate, more particularly to facilities having a specific oxide film layer. The facilities disclosed in the present invention are preferable for producing an aromatic polycarbonate by the melt ester interchange method and suitable for producing an aromatic polycarbonate containing a reduced amount of foreign materials, typically fine foreign materials, in the polymer.

In the statement of the present description and claims, "aromatic dihydroxy compound" is sometimes called as "aromatic diol compound", "catalyst deactivation agent" is sometimes called as "catalyst inactivation agent", and "end-capping agent" is sometimes called as "terminal blocking agent".

Further, the "foreign materials" are constituted by black foreign materials represented by polymer degradation materials, fine crystals of aromatic polycarbonate, dust, dirt, sand, etc., derived from the outside, besides "gels" derived from a cross-linked molecular structure. Especially, the gel state foreign materials are also called as "gels" or "gel foreign materials". When referring to "fine foreign materials", it means mainly smaller materials in the "foreign materials", specifically those having the size of $10\mu$ or smaller.

PRIOR ARTS

An aromatic polycarbonate resin is excellent in mechanical characteristics such as impact resistance, and also in heat resistance and transparency, and used widely as a molding material. As the method for producing such an aromatic polycarbonate, a method for directly reacting an aromatic dihydroxy compound such as bisphenol with phosgene (an interfacial method), and a method for performing an ester interchange reaction of an aromatic dihydroxy compound such as bisphenol with a carbonic acid diester such as diphenyl carbonate (a molten method) are known.

Among such production methods, the method for producing an aromatic polycarbonate by the ester interchange reaction of an aromatic dihydroxy compound with a carbonic acid diester is drawing attention because it is a method benevolent to the environment without using harmful phosgene or methylene chloride, and also because it is pointed out that there is a possibility that this method is better in view of its cost than the interfacial method.

However, as to the quality of the aromatic polycarbonate obtained by the melting method, it is difficult to obtain an excellent quality material because of deteriorated color tone, etc., due to severe reaction conditions, etc. In recent years, further improvements in color tone and heat stability are required for the aromatic polycarbonate used for a substrate of an optical information recording medium such as DVD, CD, MO, etc., since a discoloration due to the lack of heat stability and a gelation due to a thermal transformation, directly affect optical characteristics such as a block error rate, etc., and mechanical characteristics such as tensile, flexural properties, toughness, etc.

Further, as to the carbonic acid diester used as a raw material for the aromatic polycarbonate, diphenyl carbonate is preferably used, but diphenyl carbonate has been conventionally produced by reading phosgene with phenol in the presence of an acid capturing agent, preferably using a basic catalyst.

Diphenyl carbonate produced by the above method usually contains chlorine compounds derived from phosgene used as the raw material or an intermediate chloroformate, but since the chlorine compounds give adverse effect on the color tone of the polymer, attention has been drawn to the chlorine compounds and various purification processes have been proposed to decrease them.

For example, various purification processes were proposed in Japanese Patent Publication Sho 38-18686; Method for producing diphenyl carbonate using a basic catalyst such as an amine, Japanese Patent Publication Sho 41-10812; Removal of chloroformate by a surfactant, Plastic Material Course (vol. 17), page 4–47, published by Nikkan Kogyou Shinbunsha, etc. However, the diphenyl carbonate produced or purified by such a method usually contains, as an impurity, a nitrogen-containing compound having used as the catalyst.

Also, recently a method for directly producing diphenyl carbonate from phenol and carbon monoxide in the presence of a group 8 noble metal catalyst is attracting attention as a method without using phosgene.

In the above process, for example in Japanese Unexamined Patent Publication Hei 7-188,116 (Bayer Co., Ltd.), a quaternary ammonium salt was stated as an indispensable component of the catalyst system, but there was a problem in that thus produced diphenyl carbonate usually contains a nitrogen-containing compound as an impurity.

Regarding the facility materials, there have been various problem as follows.

In recent years, for the aromatic polycarbonate used for an optical disc, etc., a material showing a small error rate is desired in accordance with the improvement in recording density, that is, a polymer having a reduced amount of foreign materials represented by fine foreign materials, one of the causes of error rate generation, has been desired for the aromatic polycarbonate satisfying these demands.

For this purpose, as a method for producing an aromatic polycarbonate by the ester interchange method, various studies have been made up to now. For example, in Japanese Unexamined Patent Publication Hei 9-241370, a method for producing a high molecular weight aromatic polycarbonate having a good color tone by using a material with a quality substantially not having FeOOH, CrOOH and NiOOH components which are usually existing at the surface of a part contacting a liquid, was disclosed.

In Japanese Unexamined Patent Publication Hei 8-277327, a method for producing a high molecular weight aromatic polycarbonate having a good color tone by a heat treatment of the stainless steel part to be in contact with the liquid, is disclosed. And also, in Japanese Patent Publication Hei 8-5957, a method for producing the aromatic polycarbonate having a good hue by performing the reaction in the reaction facilities in which parts contacting the reaction mixture are composed of a metal or an alloy comprising 85% by weight or more of copper and/or nickel was disclosed.

In Japanese Unexamined Patent Publication Hei 6-345860, a method for producing a high molecular weight aromatic polycarbonate excellent in heat resistance, hydrolysis resistance, hue and impact resistance by using a material contacting the reaction mixture with a quality so that the iron content is 20 weight % or less in the first polymerization process and 20 weight % or more in the second polymerization process, was disclosed.

For suppressing a cost thereof it is preferable to use an inexpensive and easily available stainless alloy as the polymer producing facilities. As for a method for producing an aromatic polycarbonate by using the stainless alloy, improvement of the polymer quality by pre-treating the facilities has been already studied and several patent publications were disclosed.

For example, in Japanese Unexamined Patent Publication Hei 4-7328, a method for producing an aromatic polycarbonate wherein the inside surface of the reaction facilities is buff-polished, was disclosed. In Japanese Unexamined Patent Publication Hei 4-7329, a method applying acid-washing to stainless alloy reaction facilities was disclosed. In Japanese Unexamined Patent Publication Hei 6-200008, a method of washing the reaction facilities is performed after the completion of the reaction using a phenolic compound as a cleansing treatment, was disclosed. In Japanese Unexamined Patent Publication Hei 6-56984, a method for performing the polymerization after washing a reactor made of a stainless steel with a liquid containing an aromatic hydroxy compound, was disclosed.

However, in spite of demands for grades for the aromatic polycarbonate for the optical disc applications with reduced levels of various foreign materials such as contaminants like as dust, dirt, etc. from the outside, fine foreign materials derived from fine crystals of the aromatic polycarbonate, black foreign materials of degraded polymers, methods for producing the polymer meeting these demands have not been achieved.

Further, in any of these Patent Publications, the reduction of foreign materials represented by the fine foreign materials mentioned in the present invention, has not been studied at all.

As another method to obtain an aromatic polycarbonate having a reduced amount of the foreign materials, for example, in Japanese Unexamined Patent Publication Hei 5-239334, an aromatic hydroxy compound with a carbonate diester was subjected to a melt polycondensation in the presence of a catalyst, an additive was added thereto, and the mixture was kneaded and then filtered by a polymer filter to obtain an aromatic polycarbonate containing little foreign materials and useful for optical use, was described. In Japanese Unexamined Patent Publication Hei 6-234845, a method to install at least one filter at each of the front inlet and the discharging port of a final reaction vessel was described.

However, though with these methods, foreign materials having a specific size can be removed in accordance with the filtering accuracy of a filter, it is insufficient as a method for reducing the generation of foreign materials and does not render a fundamental solution. To prevent clogging of a filter and to suppress the processing cost increase caused by the filter exchanging, it is also desired to develop a production process for an aromatic polycarbonate, capable of preventing generation of foreign materials including the above-mentioned fine foreign materials.

In Japanese Unexamined Patent Publication Hei 10-226723, a method for obtaining an aromatic polycarbonate having less discoloration and containing less foreign materials characterized by the linear velocity of the polymer being made to be 0.05 m/sec or higher when the number-average molecular weight of the molten polymer is less than 2500 and 0.005 m/sec or higher when the number-average molecular weight of the molten polymer is 2500 or larger in the production of an aromatic polycarbonate wherein the polymer is transferred through pipes during and after the polymerization, was disclosed. But this is still insufficient as a fundamental solution of the problems.

Further, since the problems of discoloration and foreign materials are, in view of the optical use for example, those that should be dealt with as a characteristic common to the block error rate, etc., demands for a general countermeasure to the aromatic polycarbonate as a raw material of the optical goods are becoming stronger.

Thus, various studies have been tried for solving these problems.

DETAILED DESCRIPTION OF THE INVENTION

Figure 1:
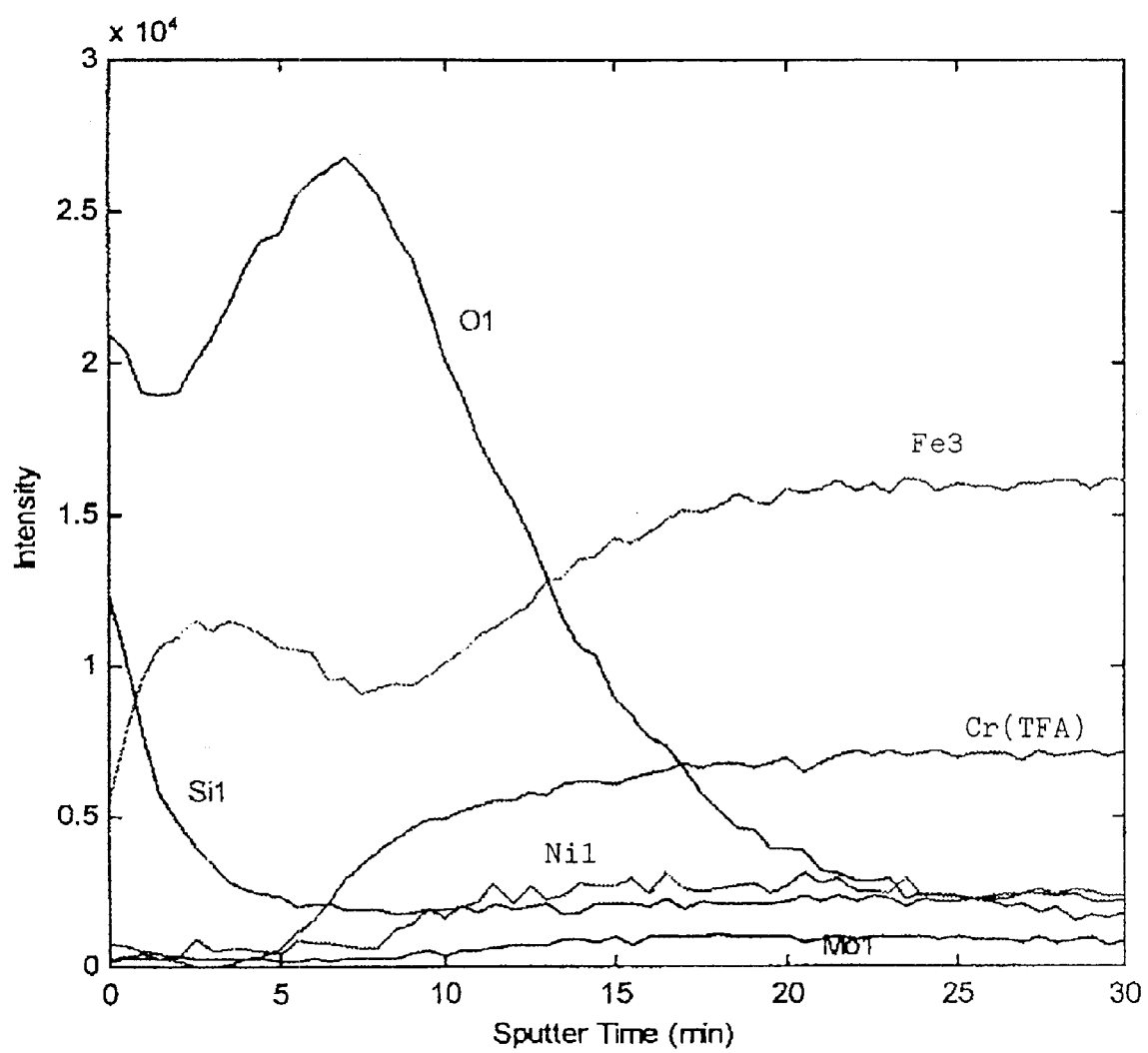
FIG. 1 is a result of the Auger electron spectroscopic analysis of a similarly treated test piece for analysis (test piece having a diameter of 10 mm and a thickness of 1 mm) as shown in FIG. 1.

It was elucidated during the above mentioned proceeding that one of the effective method is to strictly control the molar balance of an aromatic dihydroxy compound with a carbonic acid diester as the two raw materials used in the melt method. However, it is difficult to strictly control the molar balance actually, and much labor was required to realize it.

As to the molar balance between the aromatic dihydroxy compound with the carbonic acid diester, it was considered that a reason that an aromatic polycarbonate having an excellent quality is obtained by controlling the molar balance of the raw materials strictly in the melt process, is that, since the polymerization proceeds by an ester interchange reaction involving the terminal groups of the two raw materials, the polymerization rate is increased when the molar concentrations of them agree to each other and a period of time exposed to severe polymerization conditions becomes short as the result (thermal history).

Since the concentration of the terminal groups decreases along with the progress of the polymerization, and the polymerization condition becomes generally severer along with the progress of the polymerization, it is important to still keep a suitable molar balance between the terminal groups even in a state of a decreased terminal groups, and therefore a strict control of the molar balance is required.

Especially, in recent years, the aromatic polycarbonate has been used in optical recording products requiring a high density and a high accuracy such as a DVD, an MO, a CDR, etc., and in this case, since the discoloration, branched chains and gels of the aromatic polycarbonate directly affect the optical characteristics of final products such as a block error rate, etc., and the mechanical characteristics such as tensile, flexural and toughness characters, etc., the importance of the molar balance control of the raw materials increases in order to avoid these problems.

On the other hand, since many aromatic dihydroxy compounds used as a raw material have high melting points and poor stability in their molten states, handling them in a powdery state was preferred. However, the conveyance and weighing of the powdery material is more difficult than those of liquid states.

Some of the present invention was developed as a result of an study in order to solve these problems. That is, the object of the present invention is to improve the problems of the conventional technologies and to provide a method for producing an aromatic polycarbonate having an excellent quality in a good efficiency. By the present invention, it becomes possible to perform an accurate molar balance adjustment of the raw materials, therefore to obtain a product having little discoloration and a desired degree of polymerization, and to bring an extremely good result on the quality of the product.

Also, the inventors of the present invention eagerly studied to find out a method for producing an aromatic polycarbonate produced by the ester interchange method excellent in color tone and thermal stability, and found out that the aromatic polycarbonate produced by making the concentration of a nitrogen-containing basic compound in the reaction mixture used as an ester interchange reaction catalyst within a specific range, has an excellent color tone and thermal stability to accomplish some of the present invention.

In the present invention, since a specific amount of an alkali metal compound and/or an alkaline earth metal compound were used as catalysts, and further a nitrogen-containing basic compound was also used as the catalyst in the production of an aromatic polycarbonate, and since the ester interchange reaction was further progressed while making the amount of the nitrogen-containing basic compound contained in a reaction mixture within a specific range in the production of an aromatic polycarbonate having a viscosity-average molecular weight in a specific range, it is possible to obtain an aromatic polycarbonate excellent in color tone without a thermal degeneration and color tone deterioration.

As to the solvent for the catalyst, there were following problems. In the production of an aromatic polycarbonate by the melt polycondensation reaction, the polymerization is conducted in the presence of a catalyst and as the catalyst, usually an alkali metal salt, an alkaline earth metal salt, a basic compound such as a quaternary ammonium salt, or the like, is used. As the method for addition of the catalyst, a method to add, at the beginning or in the middle of the polymerization, a catalyst in a form of a solution obtained by dissolving the catalyst or a slurry obtained by dispersing the catalyst in the same monohydroxy compound as the distillate of the polymerization is employed.

At that time, from the view point of the production cost, the monohydroxy compound produced as a byproduct after obtaining an aromatic polycarbonate by the melt polycondensation reaction, is recycled and used as the solvent. However, in the recycled monohydroxy compound, impurities derived from additives such as catalysts and a stabilizer are included, which are not contained in an usual monohydroxy compound.

Further, in using the byproduct monohydroxy compound as a solvent for adding the catalyst in the melt polycondensation of the aromatic polycarbonate, the monohydroxy compound is purified by a distillation under a reduced pressure, etc., for removing the impurities. It is considered removal of the impurities in the monohydroxy compound to a higher degree was possible by repeating a multiple number of purifications or using a large scale facility. It is, however, disadvantageous in view of cost or productivity, and as impurities are apt to remaining the monohydroxy compound even after the purification, they will be a cause of discoloration in the production of the aromatic polycarbonate using it as the solvent for adding the catalyst.

As a result of repeated eager studies on this problem, the inventors found out that it was effective for producing the aromatic polycarbonate having an excellent hue to recycle, for use as a solvent for adding the catalyst, the monohydroxy compound produced as a byproduct in the production of the aromatic polycarbonate by the melt polycondensation using the carbonic acid diester as a raw material and to have the solvent contain a specific amount of anisole and/or a specific amount of trimethylamine in order to complete some part of the present invention.

By the present invention, in the method for producing an aromatic polycarbonate by the melt polycondensation using a carbonic acid diester as a raw material, a method for producing the aromatic polycarbonate having an excellent hue is provided by recycling the monohydroxy compound produced as a byproduct in the above melt polycondensation reaction for use as a solvent for adding the catalyst, the solvent also containing a specific amount of anisole and a specific amount of trimethylamine.

Further, some part of the present invention was accomplished by finding out, as a result of eager studies by the inventors of the present invention that it is effective to use a carbonic acid diester obtained with content of a specific impurity suppressed at a specific amount or smaller, in order to produce an aromatic polycarbonate having an excellent color tone.

By the present invention, it is possible to provide a carbonic acid diester excellent in storing stability and suitable for producing an aromatic polycarbonate by performing the ester interchange with an aromatic dihydroxy compound. And also, by using the carbonic acid diester, it is possible to obtain an aromatic polycarbonate having a good quality and color tone.

Also, as to the material quality of the reaction facilities, it was found out to our surprise that the generation of the foreign materials is suppressed by using reaction facilities consisting of a stainless alloy comprising a specific amount of a specific metal, as a result of the studies to find out a method for producing an aromatic polycarbonate with suppressed generation of the foreign materials by the ester interchange method on an industrial scale. Thus, some other part of the present invention provides a method for producing an aromatic polycarbonate with suppressed generation of foreign materials, characterized in that the production is carried out by using reaction facilities made of a stainless alloy comprising a specific amount of a specific metal.

By the invention, it is possible to obtain an aromatic polycarbonate in which generation of foreign materials is suppressed, by using reaction facilities of which material quality is a stainless alloy and the total amount of niobium and/or vanadium contained therein is 10 ppm to 1,000 ppm. Thereby, it is possible to produce an aromatic polycarbonate useful for applications such as an optical disc which requires reduced level of foreign materials.

An object of the some other part of the present invention is to provide polymerization facilities useful for the production of a high-quality aromatic polycarbonate in which the amount of foreign materials represented by the fine foreign materials is reduced. More particularly, the object of the invention is to provide reaction facilities useful for producing a high-quality aromatic polycarbonate with reduced generation of foreign materials represented by the fine foreign materials, without a problem of clogging of the polymer filter and preferably used for optical applications, by forming a specific oxide film layer on the inner wall surface of part or the whole of the reaction facilities, even if a common material such as a stainless alloy is used for the facilities.

And anther object of the invention is to provide a method for producing a high-quality aromatic polycarbonate useful for the optical applications, in which foreign material represented by the fine foreign materials, especially gel state foreign materials are reduced by using the above reaction facilities.

Further, by the present invention, it is possible to produce an aromatic polycarbonate with reduced foreign materials represented by the fine foreign materials by using the facilities having a specific surface oxide layer in the production of an aromatic polycarbonate, especially in the production of an aromatic polycarbonate by the ester exchange method.

It was elucidated that foreign materials represented by the fine foreign materials, especially fine gel state foreign materials can be reduced more effectively by the facilities and the methods of the present invention.

The aromatic polycarbonate produced with the facilities disclosed in the present invention, is especially useful for the applications in optical materials, especially for the optical disc, preferably used for the application for the recording material having a small error rate.

Thus, the present invention is as follows:

1. A method for producing a polycarbonate by supplying an aromatic dihydroxy compound powder and a carbonic acid diester into a raw material melting vessel, mixing and melting them, followed by a melt polymerization in the presence or absence of a catalyst, wherein the pressure of a gas phase of the raw material melting vessel is kept at 0 MPa to 0.05 MPa (gauge pressure).

2. A production method as described in 1 above, wherein 90 volume % or more of the atmospheric gas in a transportation piping positioned directly before the raw material melting vessel which is for supplying the aromatic dihydroxy compound powder to the raw material melting vessel is a non oxidizing gas and a linear velocity thereof is 0.5 cm/min or higher.

3. A production method as described in either one of the above 1 or 2, wherein a vent piping of the raw material melting vessel is connected to a scrubber.

4. A production method as described in any of the above 1 to 3, wherein the vent piping of the raw material melting vessel is connected to a condenser kept at a temperature of 70° C. or higher.

5. A production method as described in any of the above 1 to 4, wherein the carbonic acid diester is diphenyl carbonate.

6. A production method of an aromatic polycarbonate by reacting a mixture mainly containing an aromatic dihydroxy compound and a carbonic acid diester by the ester interchange reaction using an alkali metal compound and/or an alkaline earth metal compound, and a nitrogen-containing basic compound as the catalyst, wherein the concentration of the nitrogen-containing basic compound in the reaction mixture is kept in a range of not less than 0.1 ppm and not more than 10 ppm during a period in which the viscosity-average molecular weight of the reaction mixture is between 500 and 3,000 and not less than 0.01 ppm and not more than 1 ppm during a period in which the viscosity-average molecular weight of the reaction mixture is between 3,000 and 10,000.

7. A production method as described in the above 6, wherein $10^{-3}$ to $10^{-8}$ equivalent as the metal of the alkali metal compound and/or the alkaline earth metal compound is used based on 1 mol of the aromatic dihydroxy compound.

8. A production method as described in the above 6, wherein $5 \times 10^{-6}$ to $1 \times 10^{-8}$ equivalent as the metal of the alkali metal compound and/or the alkaline earth metal compound is used based on 1 mol of the aromatic dihydroxy compound.

9. A production method as described in any of the above 6 to 8, wherein the nitrogen-containing basic compound is expressed by the following general formula (1) (wherein $R_1$ is an alkyl group having a carbon number of 1 to 4 or an aryl group having a carbon number of 6 to 12).

$$(R_1)_4 NOH \tag{1}$$

10. A production method of as described in any of the above 6 to 9, wherein the aromatic dihydroxy compound is 2,2-bis(4-hydroxyphenyl)propane, and the carbonic acid diester is diphenyl carbonate.

11. A production method of an aromatic polycarbonate by the melt polycondensation reaction using a carbonic acid diester as a raw material, wherein a monohydroxy compound produced as a byproduct of the melt polycondensation reaction is recycled to be used as a solvent for adding the catalyst, the solvent for adding the catalyst containing not less than 1 ppm and not more than 1,000 ppm of anisole.

12. A production method of an aromatic polycarbonate by the melt polycondensation reaction using a carbonic acid diester as a raw material wherein a monohydroxy compound produced as a byproduct of the melt polycondensation reaction is recycled to be used as a solvent for adding the catalyst, the solvent for adding the catalyst containing not less than 1 ppm and not more than 100 ppm of trimethylamine.

13. A production method of an aromatic polycarbonate by the melt poly condensation reaction using a carbonic acid diester as a raw material wherein a monohydroxy compound produced as a byproduct of the melt polycondensation reaction is recycled to be used as a solvent for adding the catalyst, the solvent for adding the catalyst containing not less than 1 ppm and not more than 1,000 ppm of anisole and not less than 1 ppm and not more than 100 ppm of trimethylamine.

14. A production method of an aromatic polycarbonate as described in any of 11 to 13, wherein the monohydroxy compound is phenol.

15. A production method of an aromatic polycarbonate as described in any of the above 11 to 14, wherein the catalyst used in the melt polycondensation reaction is a quaternary ammonium salt or a quaternary phosphonium salt and/or an alkali metal salt, or a quaternary ammonium salt or a quaternary phosphonium salt and/or an alkaline earth metal salt.

Further, the present invention relates to a carbonic acid diester excellent in storing stability containing not more than 5 ppm based on nitrogen atom of a nitrogen-containing compound, not more than 0.5 ppm of a metallic element and not more than 10 ppm of an organic impurity which is suitable for the producing an aromatic polycarbonate, by heating-melting an aromatic dihydroxy compound and a carbonic acid diester in the presence of a catalyst containing an alkali metal compound and/or an alkaline earth metal compound and performing the ester interchange reaction.

Furthermore, the present invention relates to a method for producing an aromatic polycarbonate having a good quality and hue by using a carbonic acid diester of which content of a specific impurity is suppressed to a specific value or below in the production of the aromatic polycarbonate by heating-melting the aromatic dihydroxy compound and the carbonic acid diester in the presence of a catalyst to perform the ester interchange reaction.

Thus, some other parts of the present invention are as follows.

16. A carbonic acid diester excellent in storing stability and suitable for producing an aromatic polycarbonate by heating-melting an aromatic dihydroxy compound and a carbonic acid diester in the presence of a catalyst comprising an alkali metal compound and/or an alkaline earth metal compound to perform the ester interchange reaction, wherein the diester contains not more than 5 ppm based on nitrogen atom of a nitrogen-containing compound, not more than 0.5 ppm of each of the metallic elements contained therein and not more than 10 ppm of a salicylic acid derivative.

17. A carbonic acid diester as described in the above 16, wherein the total amount of iron, tin, chromium, titanium, and copper in said metallic elements, is 0.5 ppm or less.

18. A carbonic acid diester as described in either one of the above 16 and 17, wherein the total amount of all of the said metals is 0.5 ppm or less.

19. A production method of an aromatic polycarbonate by heating-melting an aromatic dihydroxy compound and a carbonic acid diester in the presence of a catalyst comprising an alkali metal compound and/or an alkaline earth metal compound to perform the ester interchange reaction, wherein as the carbonic acid diester, a carbonic acid diester as described in any of the above 16 to 18 is used, and as the catalyst, $5.0 \times 10^{-8}$ to $5.0 \times 10^{-6}$ equivalent of the alkali metal compound and/or the alkaline earth metal compound and $1.0 \times 10^{-5}$ to $5.0 \times 10^{-4}$ equivalent of a nitrogen-containing basic compound are used.

Further, some other parts of the present invention are as follows,

20. A production method of an aromatic polycarbonate by the ester interchange reaction of an aromatic dihydroxy compound and a carbonic acid diester with suppressed generation of foreign materials, wherein the material quality of the reaction facilities is a stainless alloy, the total content of niobium and/or vanadium in the stainless alloy being from 10 ppm to 1,000 ppm.

21. A production method of an aromatic polycarbonate as described in the above 20, wherein the catalyst used for the ester interchange reaction comprises an alkali metal compound and/or a nitrogen-containing basic compound and the amount of the used alkali metal compound being $1 \times 10^{-8}$ to $5 \times 10^{-6}$ mole based on 1 mole of the aromatic dihydroxy compound.

22. Production facilities of an aromatic polycarbonate, wherein an oxide layer having a thickness of at least 20 nm or more and comprising iron oxide as a main component is formed at part or the whole of the inner wall surface of the reaction facilities used for the production of the aromatic polycarbonate.

23. Production facilities of an aromatic polycarbonate as described in the above 22, wherein the oxide layer comprising iron oxide as a main component is formed at the inner wall surface of the facilities made of a stainless alloy.

24 Production facilities of an aromatic polycarbonate as described in either one of the above 22 and 23, wherein the oxide layer comprising iron oxide and chromium oxide as main components is formed at part or the whole of the inner wall surface of the facilities in at least 20 nm thickness.

25. Production facilities of an aromatic polycarbonate as described in any of the above 22 to 24, wherein the aromatic polycarbonate is produced by the ester interchange reaction of an aromatic dihydroxy compound and a carbonic acid diester in the presence of a catalyst.

26. A production method of an aromatic polycarbonate by the ester interchange reaction of an aromatic dihydroxy compound and a carbonic acid diester in the presence of a catalyst, wherein the production is carried out by using the reaction facilities as described in any of the above 22 to 25.

27. A production method of an aromatic polycarbonate, wherein the production is carried out by combining the above 19 with any one of the above 6, 8 or 9.

28. A production method of an aromatic polycarbonate, wherein the production is carried out by combining the above 27 with the above 26 and/or 20.

29. A production method of an aromatic polycarbonate, wherein the production is carried out by combining the above 27 with any one of the above 1 to 4.

30. A production method of an aromatic polycarbonate, wherein the production is carried out by combining the above 27 with the above 14.

31. A production method of an aromatic polycarbonate, wherein the production is carried out by combining the above 28 with the above 14.

32. A production method of an aromatic polycarbonate, wherein the production is carried out by combining the above 31 with any one of the above 1 to 4.

33. A production method of an aromatic polycarbonate, wherein the production is carried out by combining at least any two of the above 19, 6, 26, 20, 11 and 1, except for the production method of the aromatic polycarbonate by the combination of the above 19 with 6, the combination of the above 19 with 6 and 26, the combination of 19 with 6 and 20, and the combination of 19 with 6 and 1.

It is noted that, while "a period in which the viscosity-average molecular weight of a reaction mixture is between 500 and 3,000" or "a period in which the viscosity-average molecular weight of a reaction mixture is between 3,000 and 10,000" means that "all the periods in which the viscosity-average molecular weight of the reaction mixture is substantially kept between 500 and 3,000 or 3,000 and 10,000", in the case of using a completely mixed vessel for obtaining the reaction mixture in the continuous reaction facilities, the condition is met by the state in the completely mixed vessel when the viscosity-average molecular weight of the reaction mixture at the discharging port of the completely mixed vessel is in this range.

The present invention is further described in detail below.

Although there are various kinds of the aromatic polycarbonates related to the present invention, especially an aromatic polycarbonate obtained by performing a melt polycondensation reaction of a mixture comprising an aromatic dihydroxy compound expressed by the following formula (2)' and a carbonic acid diester expressed by the following formula (3)' in the presence of an ester interchange catalyst, etc., comprising a nitrogen-containing basic compound and an alkali metal compound, etc., is desirable.

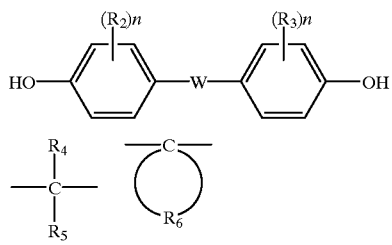

(2)'

(wherein W is either of the above two formulae or —O—, —S—, —SO— or —SO$_2$—)

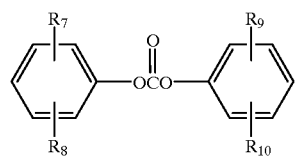

(3)'

In the above formula (2)', n is 0 to 4, $R_2$ and $R_3$ are each the same or a different halogen atom or a hydrocarbon group having a carbon number of 1 to 12; $R_4$ and $R_5$ are each the same or a different halogen atom, a hydrogen atom or a hydrocarbon group having a carbon number of 1 to 12. As the hydrocarbon group, an aliphatic hydrocarbon group having a carbon number of 1 to 12 such as an alkyl group, etc. or an aromatic hydrocarbon group having a carbon number of 6 to 12 such a phenyl group, etc. are preferable. As the halogen atom, chlorine, bromine, iodine, etc., are exemplified. $R_6$ is an alkylene group having a carbon number of 3 to 8. As the alkylene group, pentylene group, etc. are exemplified.

As the aromatic dihydroxy compounds related to the present invention, for example, bis(4-hydroxyphenyl) methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)oxide, bis(3,5-dichloro-4-hydroxyphenyl)oxide, p,p'-dihydroxydiphenyl, 3,3'-dichloro-4,4-dihydroxydiphenyl, bis(hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide, bis(4-hydroxyphenyl)sulfoxide, etc., are exemplified, and especially 2,2-bis(4-hydroxyphenyl)propane is preferable.

In the above formula (3)', $R_7$, $R_8$, $R_9$, $R_{10}$ are each the same or a different hydrogen atom, alkyl group having a carbon number of 1 to 4, phenyl group or halogen group.

As a carbonic acid diester related to the present invention, for example, diphenyl carbonate, ditolyl carbonate, bis (chlorophenyl) carbonate, dinaphthyl carbonate, bis (diphenyl) carbonate, dimethyl carbonate, diethyl carbonate, dibutyl carbonate and dicyclohexyl carbonate are exemplified, and especially diphenyl carbonate and ditolyl carbonate are preferable.

In the production of the aromatic polycarbonate in the present invention, 1.00 to 1.20 moles, preferably 1.005 to 1.10 moles, further preferably 1.01 to 1.05 moles of the above mentioned carbonic acid diester is used based on 1 mole of the aromatic dihydroxy compound.

Further, the aromatic polycarbonate in the present invention is allowed to contain for example, ethylene glycol 1,4-butane diol, 1,4-cyclohexane dimethanol, 1,10-decane diol etc., as an aliphatic dihydroxy compound (diol), for example, succinic acid, isophthalic acid, 2,6-naphthalene dicarboxylic acid, adipic acid, cyclohexane carboxylic acid, terephthalic acid, etc., as a dicarboxylic acid, and for example lactic acid, p-hydroxybenzoic acid, 6-hydroxy-2-naphthoic acid, etc., as an oxycarboxylic acid if necessary.

As the catalyst, an alkali metal compound, an alkaline earth metal compound and a nitrogen-containing basic compound can be used.

As the ester exchange catalyst in the melt polycondensation method using the monohydroxy compound produced as a byproduct to be recycled as a solvent of the catalyst, a quaternary ammonium salt or a quaternary phosphonium salt and/or an alkali metal salt, or the quaternary ammonium salt or the quaternary phosphonium salt and/or an alkaline earth metal salt are preferably used.

As the alkali metal compound used as the catalyst in the present invention, for example, a hydroxide, hydrogen carbonate, carbonate salt, acetate salt, nitrate salt, nitrite salt, sulfite salt, cyanate salt, thiocyanate salt, stearic acid salt, borohydride salt, benzoic acid salt, hydrogen phosphate, and a salt of bisphenol or phenol are exemplified. As concrete examples, sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium nitrate, potassium nitrate, lithium nitrate, sodium nitrate, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium tetraphenyl borate, sodium benzoate, potassium benzoate, lithium benzoate, disodium hydrogen phosphate, dipotassium hydrogen phosphate, dilithium hydrogen phosphate disodium salt, dipotassium salt and dilithium salt of bisphenol A, sodium salt, potassium salt and lithium salt of phenol etc., are exemplified, and especially, a sodium salt of the aromatic dihydroxy compound, for example, disodium salt of bisphenol A, or a sodium salt of an aromatic monohydroxy compound, for example sodium salt of phenol are preferably used.

As the ester exchange catalyst, an alkali metal compound and/or an alkaline earth metal compound are the most preferable in view of their performance, but in case these compounds are used singly, for example, the ester interchange reaction rate of a carbonic acid diester with BPA would be slow, when the ester interchange conversion is smaller than 50%, that is, on the initial polymerization stage, to cause problems when applied on an industrial scale. Therefore, it is preferable to use a nitrogen-containing basic compound and/or a basic phosphorus compound described later together with an alkali (and/or an alkaline earth) metal compound catalyst.

The alkali metal compound and/or alkaline earth metal compound as the catalyst related to the present invention are used in a way where the alkali metal compound and/or alkaline earth metal compound in the catalyst are in a range of $1\times10^{-3}$ to $1\times10^{-8}$ equivalent, preferably $5\times10^{31\ 6}$ to $1\times10^{-8}$ equivalent, more preferably $5\times10^{-6}$ to $1\times10^{-7}$ equivalent as the metal per 1 mole of the aromatic dihydroxy compound.

Deviation from the above range is not preferable since it causes problems such as deterioration of various physical properties of obtained aromatic polycarbonate and insufficient completion of the ester interchange reaction which prevents from obtaining a high molecular weight aromatic polycarbonate. Particularly, if the alkali metal compound and/or the alkaline earth metal compound catalysts are used in an excessive amount, the decomposition and the branch formation are apt to take place by the rearrangement of the polycarbonate bonds, when the polymerization temperature is elevated at the later period of the reaction. Therefore, since the amounts of such decomposition and branch formation are great, the flow property and color tone of the aromatic polycarbonate obtained by the melt polymerization method by the ester interchange are inferior to those of the aromatic polycarbonate obtained by the interfacial polymerization method.

In order to make the flow property and color tone of the aromatic polycarbonate obtained by the melt polymerization method at a similar degree compared with those of the aromatic polycarbonate obtained by the interfacial polymerization method, it is necessary to reduce the amount of the above decomposition and branch formation to 0.2 mole % or less per the recurring unit. To this end, it is preferable to suppress the amount of the alkali metal compound and/or alkaline earth metal compound catalyst to less than $5\times10^{-6}$ equivalent per 1 mole of the aromatic dihydroxy compound.

That is, a preferable ratio of the used amount of the alkali metal compound and/or alkaline earth metal compound is $5\times10^{-8}$ to $5\times10^{-6}$ equivalent per 1 mole of the aromatic dihydroxy compound. If the amount deviates from the above range, it is not preferable since it would cause problems such as deterioration of various physical properties of obtained aromatic polycarbonate and insufficient completion of the ester interchange reaction which prevents from obtaining a high molecular weight aromatic polycarbonate.

If the amount of nitrogen-containing basic compound contained in the reaction mixture related to the present invention is set so as to become a specific value while the molecular weight of the reaction mixture is in a specific range as described later, then an aromatic polycarbonate having an excellent color tone and thermal stability can be obtained, and if the amount of the catalyst is also in the above usage range, then further excellent color tone and thermal stability is realized and a higher molecular weight aromatic polycarbonate is obtained easily with excellent various physical properties of the aromatic polycarbonate.

In the above formula (1), $R_1$ is an alkyl group having a carbon number of 1 to 4 or an aryl group having a carbon number of 6–12, but other than such desirable compounds, for example, a tertiary amine such as triethylamine and a borate can also be used.

As such a nitrogen-containing basic compound, for example, an ammonium hydroxide having an alkyl aryl alkylaryl group or the like, such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide ($Ph-CH_2(Me)_3NOH$), hexadecyltrimethylammonium hydroxide, etc., a tertiary amine such as triethylamine, triutylamine, dimethylbenzylamine, hexadecyimethylanine, etc., or a basic salt such as tetramethylammonium borohydride ($Me_4NBH_4$), tetrabutylammonium borohydride ($Bu_4NBH_4$), tetrabutylammonium tetraphenylborate ($Me_4NBPh_4$), tetrabutylammonium tetraphenylborate ($Bu_4NBPh_4$), etc., can be exemplified, and among them, tetramethylammonium hydroxide ($Me_4NOH$) is most preferable and widely used.

As a quaternary phosphonium salt, for example, a phosphonium hydroxide having an alkyl axyl, alkylayl group or the like such as tetramethyl phosphonium hydroxide ($Me_4POH$), benzyltrimethylphosphonium hydroxide ($Ph-CH_2(Me)_3POH$), hexadecy trimethylphosphonium hydroxide, etc., or a basic salt such as tetramethylphosphonium borohydride ($Me_4PBH_4$), tetramethylphosphonium tetraphenylborate ($Me_4PBPh_4$), etc., can be exemplified.

The above nitrogen-containing basic compound is preferably used in a ratio of $1\times10^{-5}$ to $5\times10^{-4}$ equivalent as the basic nitrogen atom in the nitrogen-containing basic compound per 1 mole of the aromatic diol compound More preferable ratio is $2\times10^{-5}$ to $5\times10^{4-4}$ equivalent based on the same standard, and especially preferable ratio is $5\times10^{-5}$ to $5\times10^{-4}$ equivalent based on the same standard.

Besides, according to studies performed by the inventors of the present invention, it becomes clear that, in order to produce an aromatic polycarbonate having an excellent quality by the ester interchange method, the amount of use (added amount) of the above nitrogen-containing basic compound, which was considered to be important heretofore, is not so important and that it is extremely important to proceed the ester interchange reaction by keeping the concentration of the nitrogen-containing basic compound at a concentration of not less than 0.1 ppm and not more than 10 ppm during the period in which the viscosity-average molecular weight of a reaction mixture is between 500 and 3,000, and further, not less than 0,01 ppm and not more than 1 ppm during the period in which the viscosity-average molecular weight of the reaction mixture is between 3,000 and 10,000.

Here, "the reaction mixture" means the mixture in which the polycondensation reaction is initiated or under progress in a process of obtaining an aromatic polycarbonate by performing the melt polycondensation reaction of a mixture containing mainly an aromatic dihydroxy compound expressed by the above formula (2)' and a carbonic acid diester expressed by the above formula (3)' in the presence of an ester interchange catalyst comprising a nitrogen-containing basic compound, and an alkali metal compound and/or an alkaline earth metal compound. It can be said to be in a state of a "pre-polymer" in a general chemical term in case the degree of polymerization progresses to a certain extent and in the state of a "polymer" by the general chemical term in case the degree of the polymerization further progresses.

In the present invention, it is possible to use, as desired, (a) an alkali metal salt of an ate complex of a group 14 element in the Periodic Table or (b) an alkali metal salt of an oxo acid of a group 14 element of the Periodic Table as an alkali metal compound for the catalyst. Here, the group 14 elements of the Periodic Table means silicon, germanium or tin.

By using this alkali metal compound as the catalyst for the polycondensation reaction, the polycondensation reaction can be advantageously progressed rapidly and sufficiently. Also, it is possible to suppress unfavorable side reactions such as branching reaction developed during the polycondensation reaction at a low level.

(a) The alkali metal salts of the ate complex of the group 14 elements of the Periodic Table, which are those described in Japanese Unexamined Patent Publication Hei 7-268091. More concretely, compounds of germanium (Ge); $NaGe(OMe)_5$, $NaGe(OEt)_3$, $NaGe(OPr)_5$, $NaGe(OBu)_5$, $NaGe(OPh)_5$, $LiGe(OMe)_5$, $LiGe(OBu)_5$ and $LiGe(OPh)_5$ can be exemplified.

As the compounds of tin (Sn), $NaSn(OMe)_3$, $NaSn(OMe)_2(OEt)$, $NaSn(OPr)_3$, $NaSn(o-n-C_6H_{13})_3$, $NaSn(OMe)_5$, $NaSn(OEt)_5$, $NaSn(OBu)_5$, $NaSn(o-n-_{12}H_{25})_5$, $NaSn(OEt)_5$, $NaSn(OPh)_5$ and $NaSnBU_2(OMe)_3$ can be exemplified.

Further, as (b) the alkali metal salts of the oxo acid of the element of the 14th group in the Periodic Table, for example, an alkali metal salt of silicic acid, an alkali metal salt of stannic acid, an alkali metal salt of germanous (II) acid and an alkali metal salt of germanic (IV) acid are exemplified as preferable compounds.

The alkali metal salts of silicic acid are, for example, an acidic or a neutral alkali metal salt of monosilicic acid or a condensed compound thereof, and monosodium orthosilicate, disodium orthosilicate, trisodium orthosilicate and tetrasodium orthosilicate can be exemplified.

The alkali metal salts of stannic acid are, for example, an acidic or a neutral alkali metal salt of monostannic acid or a condensed compound thereof, and disodium monostanate ($Na_2SnO_3.xH_2O$, $x=0$ to 5) and tetrasodium monostanate ($Na_4SnO_4$) ca be exemplified.

The alkali metal salts of germanous (II) acid are, for example, an acidic or a neutral alkali metal salt of monogermanous acid or a condensed compound thereof and monosodium monogermate ($NaHGeO_2$) can be exemplified.

The alkali metal salt of germanic (IV) acid are, for example, an acidic or a neutral alkali metal salt of monogermanic acid or a condensed compound thereof and monolitium orthogermanate ($LiH_3GeO_4$), disodium orthogermanate, tetrasodium orthogermanate, disodium digermanate ($Na_2Ge_2O_5$), disodium tetragermanate ($Na_2Ge_4O_9$), disodium pentagermanate ($Na_2Ge_5O_{11}$) can be exemplified.

The polycondensation catalyst as mentioned above are preferably used in a ratio in which the alkali metal element in the catalyst is $1\times10^{-8}$ to $5\times10^{-5}$ equivalent based on 1 mole of the aromatic diol compound. More preferable ratio thereof is $5\times10^{-7}$ to $1\times10^{-5}$ equivalent on the same basis.

In the polycondensation reaction of the present invention, it is possible to have co-existed at least one kind of a cocatalyst selected from the group of oxo acids and oxides of the group 14 elements of the Periodic Table.

By using these cocatalyst in a specific ratio, it is possible to suppress unfavorable side reactions such as branch formation which are apt to occur in the polycondensation reaction, the generation of foreign materials and scorching during a mold process thereof, more effectively without retarding the rate of the blocking reaction of terminals thereof and the polycondensation.

As the oxo acid of the group 14 elements of the Periodic Table, silicic acid, stannic acid and germanic acid can be exemplified.

As the oxides of the group 14 elements of the Periodic Table, silicon monoxide, silicon dionide, tin oxde, tin dioxde, germanium oxide, germanium dioxide and their condensed compounds can be exemplified.

It is preferable to have a group 14 metal element of the Periodic Table in the oocatalyst existed in a ratio of 50 mole (atom) or less based on 1 mole (atom) of the alkali metal atom in the polycondensation reaction catalyst. If the cocatalyst is used with the metal element in a ratio exceeding 50 mole (atom) it is not preferable since the polycondensation rate becomes slow.

It is further preferable to have a group 14 metal element of the Perodic Table in the co-catalyst existed in a ratio of 0.1 to 30 mole (atom) based on 1 mole (atom) of the alkali metal atom in the polycondensation reaction catalyst.

Use of these catalyst systems in the polycondensation provides an advantage for progressing the polycondensation reaction and the terminal blocking reaction rapidly and sufficiently. It can also suppress unfavorable reaction such as branching reaction occurring the polycondensation at a low level.

In producing the aromatic polycarbonate by reacting mainly a mixture containing an aromatic dihydroxy compound and a carbonic acid diester under heating-melting, it is common to start the ester interchange reaction by adding the previously mentioned catalyst to the molten mixture (a reaction mixture) obtained through heating-agitating a mixture mainly containing an aromatic dihydroxy compound and a carbonic acid diester under an inert gas atmosphere.

In the present invention, there is no particular limitation to the temperature and pressure for performing the ester interchange reaction of the aromatic dihydroxy compound and the carbonic acid diester, and any condition is sufficient if the temperature and pressure selected are capable of stare the reaction and removing the monohydroxy compound produced by the reaction to the outside of the reaction system rapidly. In general the reaction temperature is between 120 to 350° C., and the temperature is generally elevated along with the progress of the polymerization.

Regarding the pressure of the reaction system, it may be possible to perform the reaction in the reaction system at normal pressure or under an elevated pressure, but in many cases at a reduced pressure. It is a common practice to facilitate easy removal of the produced phenol to promote the reaction by introducing a large to small amount of an inert gas flow in combination with the above conditions.

To be specific, most common practice is as follows: the reaction is started at a temperature of 150 to 200° C. and under a pressure of 300–100 Torr, then the reaction temperature is elevated and the pressure is reduced in accordance with the increase of the molecular weight of the aromatic polycarbonate during the progress of the reaction, and finally the reaction is conducted at a temperature of 270 to 350° C. and under a pressure of 1 Torr or less.

There is no particular limitation to the style of the facilities used for executing the present invention, and a usually known vertical type agitation vessel, a horizontal type agitation vessel or an extruder can be used.

More particularly, in the case of performing the reaction in a batch process, it is usually performed by using 2 vertical type agitation vessels, charging the aromatic dihydroxy compound and the carbonic acid diester in the above mentioned ratio into a first agitation vessel attached with a rectification column, replacing the air of the vessel with an inert gas, heating-melting the mixture, adding the previously mentioned catalyst in a prescribed amount, then heating the system with evacuation to perform the initial phase of the polymerization, then transferring the reaction liquid to a second agitation vessel without a rectifying column, further evacuating the system to a higher degree, also elevating the temperature to continue the polymerization until the polymer with the prescribed molecular weight is obtained. At that, in order to keep the concentration of the nitrogen-containing basic compound in the reaction system in a range specified by the present invention, for example, it is possible to perform the reaction by adding a suitable amount of the nitrogen-containing basic compound during the reaction in the first reaction vessel or during the process of transportation to the second agitation vessel.

In the case of performing the reaction in a continuous method, it is generally performed by using plural agitation vessels, in which a vertical agitation vessel attached with a rectifying column is used for the initial polymerization vessel where the viscosity of the reaction mixture is low, and a horizontal type agitating vessel or a double screw extruder is used as the later phase polymerization vessel where the viscosity of the reaction mixture is increased and removal of the aromatic monohydroxy compound produced as a byproduct becomes difficult, arranging them in a series, feeding the molten raw material and the catalysts into a first polymerization vessel continuously, and at the same time taking out the aromatic polycarbonate having a prescribed molecular weight from the final polymerization vessel. In this case, in order to keep the concentration of the nitrogen-containing basic compound in the system in the range of the present invention it is possible, for example, to add a suitable amount of the nitrogen-containing basic compound into any one or more of the polymerization vessels including the first agitation vessel.

Also, in order to keep the nitrogen-containing basic compound concentration in the system within the range of the present invention, it is necessary to control the concentration of nitrogen-containing impurities existing in the raw material such as the carbonic diester and the dihydroxy compound used for the reaction, and preferably keep the concentration of the nitrogen-containing compound in the raw materials at 5 ppm or less, further preferably at 4 ppm or less. By using such a raw material containing limited amount of nitrogen-containing compounds, it becomes possible to grasp and control the concentration of the nitrogen-containing basic compound used as the catalyst in the system accurately.

In this kind of a facility, it is extremely important to control a mixing molar ratio of the carbonic acid diester to the aromatic dihydroxy compound as the raw materials in a specific range.

In the present invention, it is preferable to use somewhat excessive amount of the carbonic acid diester in the ratio of used aromatic dihydroxy compound to the carbonic acid diester. This is because the boiling point of the carbonic acid diester is lower than that of the aromatic dihydroxy compound, therefore apt to be volatilized, and the rate of the carbonic diester distilled off to the outside of the system is larger than that of the aromatic dihydroxy compound even during the initial polymerization using the reaction vessel equipped with the rectifying column. Thus in the present invention, depending on the performance of the facilities used, the molar ratio of the carbonic acid diester to the aromatic dihydroxy compound generally is preferably selected at (1.005 to 1.2):1, more preferably (1.005 to 1.05):1.

In the present invention, the molar balance of the raw materials within the above molar ratio, is set depending on the desired amount of the terminal OH groups of the aromatic polycarbonate to obtain and it is important to keep the accuracy of the control thereof within 5% of the set value, preferably within 1% and more preferably within 0.5%. Thereby, it is possible to obtain the aromatic polycarbonate stably having a desired amount of terminal groups with good quality.

According to the study of the inventor of the present invention, in order to achieve these objectives, it is insufficient to use only an ordinarily used high accuracy weighing system. In many cases, the quantity of carbonic acid diester excellent in thermal stability is measured in a liquid state, and the used amount is controlled, for example, using a high quality flow meter, but the measurement of the quantity of aromatic dihydroxy compound having an inferior thermal stability is conducted in many cases in a powdery state, for example, by receiving the powdery dihydroxy compound in a weighing container isolated in weight from surrounding parts, weighing the discharged weight by a load cell etc., and discharging the powder by using a screw feeder, etc.

It is known that these weighing systems themselves have a sufficient weighing accuracy having an error of within 0.5%.

However, even by using such a high accuracy weighing facility, it is found out that much labor such as additionally charging either one of the raw material is required in order to realize the above severe molar balance.

The inventors of the present invention eagerly studied to solve this problem, and as a result, it was found out that keeping the pressure of the gas phase in the raw material melting vessel at 0 MPa to 0.05 MPa, more preferably 0 MPa to 0.01 MPa is important, and thereby the accuracy of the molar balance control is markedly improved. In this description of the invention, the pressure of the gas phase of the raw material melting vessel expressed in terms of MPa is a so-called gauge pressure, taking the normal atmospheric pressure as 0 MPa.

The reason of the above is not clear, but since the transportation of the raw material from a powder weighing vessel to the raw material melting vessel becomes smooth, and undesirable attachment and clogging of the powder in a piping is reduced, it is considered to be caused by suppressing the entry of the evaporated material generated in the raw material melting vessel into the powder weighing vessel, or the piping for transporting the raw material from the powder weighing vessel to the raw material melting vessel.

In the present invention, it was found out to be effective for improving the weighing accuracy that 90 vol. % or more of the atmospheric gas in the transportation piping for supplying the raw material situated directly before the raw material melting vessel is a non-oxidizing gas, and that the linear velocity thereof is 0.5 cm/min or higher. Here, the "non-oxidizing gas" means a gas not oxidizing the raw material, aromatic dihydroxy compound and the carbonic acid diester, and not causing discoloration. Nitrogen, an inert gas such as argon of the 18th group of the Perodic Table, and carbon dioxide are exemplified.

Further, it was also found out that the use of a scrubber and/or a condenser in the vent piping system of the raw material melting vessel is effective for keeping the pressure in the gas phase of the raw material melting vessel within a constant range and, as a result, for improving the accuracy in weighing, probably because of the reduction of the attached materials in the piping. As a result, it becomes possible to control the molar balance easily, stably and with a good accuracy, and the quality of the aromatic polycarbonate obtained by the melt polymerization method is greatly improved and also stabilized.

The fact that such fine technological factors in the transportation piping and the vent greatly affect the quality in the production of the aromatic polycarbonate, was not heretofore known and was unexpected.

In the present invention, the raw material melting vessel means an apparatus for completely melting the aromatic dihydroxy compound and the carbonic acid diester adjusted at a specific mixing molar ratio by heating at 120 to 150° C. and is equipped with an agitation device and a pump.

The agitation device has a function for completely melting the raw material and making it uniform and is activated when the raw material exists in a specific amount or more in the raw material melting vessel. The pump which is joined to the piping connected to the bottom part of the raw material melting vessel has a self circulating line as necessary, and is joined to the raw material storing vessel or directly to the melt polymerization vessel.

In the present invention, the scrubber is a general capturing device for absorbing generated vapor, etc., by citing a scrubbing liquid, and for example, is a vertical vessel connected at about the middle part in the vertical direction with the vent piping extended from the ceiling part of the raw material melting vessel, and having, on top, an exhaust tube for exhausting the gas after the absorption of the vapor. The exhaust tube may be opened up to the atmosphere, or joined with a main vent piping to which the vent pipings of the other facilities are connected.

As the scrubbing liquid, although there is no particular limitation, a solvent with a low volatility and capable of dissolving or decomposing/absorbing the aromatic dihydroxy compound and the carbonic acid diester, or a low temperature liquid capable of cooling/solidifying the vapor by its low temperature are used. For example water, an aqueous sodium hydroxide solution, triethylene glycol etc., can be used.

By supplying such a scrubbing liquid for spraying in the scubber, the gas containing the vapor introduced through the vent piping of the raw material melting vessel is made a contact with the scrubbing liquid sufficiently to capture the vapor of the aromatic hydroxy compound or the carbonic acid diester in the gas.

It is also possible to operate the scubber continuously by taking out the whole or part of the scrubbing liquid, and adding a fresh scubbing liquid thereto, when the concentration of the aromatic dihydroxy compound or the carbonic acid diester in the solvent reaches a certain value or higher.

In the present invention, the vent piping is for example, a piping for letting off the pressure of the gas phase in the raw material melting vessel generated to transport the raw materials from the powder weighing vessel to the raw material melting vessel.

The piping is preferably heated at 120° C. or higher between the raw material melting vessel and the scrubber and/or the condenser in the present invention so as not to condense or crystallize the aromatic dihydroxy compound or the carbonic acid diester.

In the present invention, as the condenser, a commonly used condenser can be used. For example, a double tube or a multiple tube type condenser can be preferably exemplified. In this case, also the vent piping connecting the raw material melting vessel with the condenser is preferably heated at 120° C. or higher for preventing the precipitation of the aromatic dihydroxy compound or the carbonic acid diester. A scrubber can be also installed after the condenser.

The discharging side of the condenser may be opened up directly to the atmosphere, or joined to a main vent piping to which the vent pipings of the other facilities are connected.

The temperature in the condenser is preferably at 70° C. or higher, more preferably 70 to 100° C. There, the gas from the melting vessel is cooled inside the condenser and the aromatic dihydroxy compound or the carbonic acid diester are condensed and returned to the raw material melting vessel. Further, it is allowed to install cooling plates inside the condenser for increasing a heat exchanging efficiency.

As to the nitrogen-containing basic compound, it is known in a general way that the used amount (added amount) of the nitrogen-containing basic compound is important in the process of promoting the ester interchange reaction.

However, it was found out that there is an occasion which does not allow production of the aromatic polycarbonate excellent in quality with a good reproducibility by simply maintaining the conventionally known initial amount of addition of the nitrogen-containing basic compound, in other words, the used amount of the nitrogen-containing basic compound as based on the aromatic dihydroxy compound within a specific range.

As a result of the detailed study of the cause of the above, the inventors of the present invention have found out that the following occurs.

Although the nitrogen-containing basic compound activates the ester interchange reaction, a heat resistance thereof in the reaction system is low, and is easily thermally decomposed, thus the effective concentration of the compound in the reaction mixture decreases rapidly by being easily decomposed or reacted with a monohydroxy compound produced by the ester interchange reaction to a trialkylamine, a triarylamine, an alkyl phenyl ether, an aryl phenyl ether, water, etc. In some cases, since the used nitrogen-containing basic compound such as trialkylamine itself is highly volatile, the effective concentration in the reaction mixture decreases rapidly. Thus, it was found that the decreasing rate thereof is affected widely by the kind of carbonic acid diester, the reaction temperature and the reaction pressure.

From the above facts, it was considered that the concentration of the nitrogen-containing basic compound contributing to the ester interchange reaction effectively, varies with the reaction conditions, and that this is a cause of failing to obtain an aromatic polycarbonate having a good quality with a good reproducibility by a conventional method of only prescribing the initial used amount of the nitrogen-containing basic compound.

Thus, as a result of various studies, it was found out that it is extremely important for imparting excellent color tone and thermal stability to the produced aromatic polycarbonate, to proceed the ester interchange reaction by keeping the concentration of the nitrogen-containing basic compound at 0.1 to 10 ppm, preferably 0.5 to 5 ppm while the viscosity-average molecular weight of the reaction mixture is between 500 and 3,000, and at 0.01 to 1 ppm, preferably 0.05 to 1 ppm while the viscosity-average molecular weight of the reaction mixture is between 3,000 and 10,000.

If the concentration of the nitrogen-containing basic compound in the reaction mixture exceeds 10 ppm during the period in which the viscosity-average molecular weight of the reaction mixture is between 500 and 3,000, it is impossible to impart the excellent color tone and thermal stability to the produced aromatic polycarbonate, and if the concentration of the nitrogen-containing basic compound in the reaction mixture becomes less than 0.1 ppm during the period in which the viscosity-average molecular weight of the reaction mixture is between 500 and 3,000, it is not preferable because of difficulty in proceeding the ester interchange reaction and problems such as a color tone deterioration, etc. caused by the increase of the thermal history due to the extended retention time.

Further, if the concentration of the nitrogen-containing basic compound in the reaction mixture exceeds 1 ppm during the period in which the viscosity-average molecular weight of the reaction mixture is between 3,000 and 10,000, it is not preferable since the deterioration of the aromatic polycarbonate becomes marked to give ill effect such as the color tone degradation, etc., in promoting the ester interchange reaction to make the viscosity-average molecular weight of 10,000 or higher, and if the concentration of the nitrogen-containing basic compound in the reaction mixture becomes less than 0.01 ppm during the period in which the viscosity-average molecular weight of the reaction mixture is between 3,000 and 10,000, it is not preferable because of difficulty in proceeding the ester interchange reaction and problems such as the color tone deterioration, etc., caused by the increase of the thermal history due to the extended retention time.

Maintaining the nitrogen-containing basic compound in a specific range while in a specific viscosity-average molecular weight range can be attained by increasing or decreasing the amount of the nitrogen-containing basic compound to be added to the mixture comprising mainly the aromatic dihydroxy compound and the carbonic acid diester, the amount of heat required for proceeding the ester interchange reaction, the degree of vacuum in the system for facilitating the distillation off of the phenolic compound produced as a byproduct, the retention time or the like. It is also possible to achieve the effect by combining two or more of the above means. Also, it is possible to maintain the concentration of the nitrogen-containing basic compound in the reaction system by supplying the nitrogen-containing basic compound at multiple occasions during the progress of the reaction.

As to the monohydroxy compound produced as a byproduct in the reaction to obtain the aromatic polycarbonate by the melt polycondensation reaction using the carbonic acid diester as the raw material it contains impurities derived from the additives such as a catalyst, stabilizer, etc., which do not exist in a usual monohydroxy compound. As the impurities, an organic compound such as trimethylamine, anisole, ortho-cresol para-creso, 2-methylbenzofuran, hydroxyacetone, acetophenone, etc., and various metal salts can be enumerated but there are many components not yet elucidated.

It was found out that it is effective for the production of the aromatic polycarbonate excellent in hue to recycle the monohydroxy compound produced as the byproduct to be used as a solvent for adding the catalyst, keeping the concentration of anisole contained in the monohydroxy compound at not less than 1 ppm and not more than 1,000 ppm or the concentration of trimethylamine at not more than 1 ppm and not more than 100 ppm.

Further, it was found out that it is effective for the production of the aromatic polycarbonate excellent in hue to recycle the monohydroxy compound produced as the byproduct to be used as a solvent for adding the catalyst, keeping the concentration of anisole contained in the monohydroxy compound at not less than 1 ppm and not more than 1,000 ppm and the concentration of trimethylamine at not more than 1 ppm and not more than 100 ppm.

The mechanism thereof is not yet clear, but it is supposed that by containing anisole and/or trimethylamine in the monohydroxy compound used as a solvent for adding catalyst, the deterioration which is apt to be generated in the monohydroxy compound in the state wherein the catalyst is added to the monohydroxy compound is suppressed to stabilize the monohydroxy compound so that the hue of the obtained aromatic polycarbonate is improved.

If the concentration of anisole contained in the recycled monohydroxy compound used as the solvent for adding the catalyst exceeds 1,000 ppm or trimethylamine exceeds 100 ppm, then it is not preferable since the hue of the obtained aromatic polycarbonate degrades. The mechanism thereof is not yet clear, but it is supposed that if asisole at a concentration exceeding 1,000 ppm or trimethylamine exceeding 100 ppm is present in the solvent for adding the catalyst, then the inhibition of the polymerization and the side reactions may develop during the polymerization reaction to produce impurities to cause the discoloration. Also, if the contents of anisole in the recycled monohydroxy compound used as the solvent for adding the catalysts, is 1 ppm or less and the trimethylamine is 1 ppm or less, then almost no effect is observed.

In order to obtain the monohydroxy compound containing not less than 1 ppm and not more than 1,000 ppm of anisole and/or not less than 1 ppm and not more than 100 ppm of trimethylamine, the monohydroxy compound produced as the byproduct in the production of the aromatic polycarbonate by the melt polycondensation, may or may not be subjected to the purification after the recovery thereof.

As to the method for purifying the monohydroxy compound produced as the byproduct in the production of the aromatic polycarbonate by the melt polycondensation, ordinarily used methods can be utilized and distillation under a reduced pressure is exemplified as a preferable method.

As the monohydroxy compound, phenol cresol, xylenol, chlorophenol, naphthol, biphenol, etc., are exemplified and phenol is used preferably.

As the monohydroxy compound used as the solvent for adding the catalysts, it is desirable not to contain the above mentioned impurities other than anisole and trimethylamine substantially, and it is also desirable to have the oxygen concentration of 100 ppm or less, since the oxygen causes oxidative deteriorations.

As to the nitrogen-containing compounds derived from the various sources contained in the carbonic acid diester, they are not a single compound having a clear chemical structure. If the nitrogen-containing compound is contained in the carbonic acid diester in an amount of exceeding 5 ppm as the nitrogen atom, then the carbonic acid diester becomes gradually discolored during its storage or preservation and some part thereof becomes not suitable as the raw material of the production of the aromatic polycarbonate although it has a good color tone (measured by the molten Hazen) just after its production.

Thus, in measuring the weather resistance of plural carbonic acid diester samples (Hazen value: the samples are stored under air, in a cool and dark place in a room, as blocked from the direct sun light, and their colors are compared with the Hazen standard colorimetric liquids after maintaining the samples in a molten state using flat bottom Pyrex colorimetric tubes based on the color number test method desired in JIS K-4101), some deteriorated samples having extremely large Hazen values, for example, a Hazen value exceeding 20 would appear. By using the carbonic acid diester including the samples having the Hazen value exceeding 20, the hue and transparency of the obtained aromatic polycarbonate become inferior. That is, the color tone of the aromatic polycarbonate produced using the raw material carbonic acid diester having a nitrogen content exceeding 5 ppm, is as expected, inferior to that of the aromatic polycarbonate produced by the interfacial polymerization method.

Thus, in order to stably obtain an aromatic polycarbonate produced using a carbonic acid diester in the melt polymerization with the hue not inferior to that of the aromatic polycarbonate produced by the interfacial polymerization method, it is necessary to limit the nitrogen content thereof at 5 ppm or less, and further it is preferable to limit the nitrogen content at 4 ppm or less.

If the nitrogen-containing compound is present in the carbonic acid diester at a concentration excessive of 5 ppm, the compound itself sometimes becomes a cause of the discoloration and sometimes causes the discoloration of the carbonic acid diester or the aromatic polycarbonate in the production of the polymer by interacting with the other impurities contained in the carbonic acid diester.

Further, it is a well-known fact to those skilled in the art that the discoloration of the aromatic polycarbonate occurs if the aromatic polycarbonate is produced using a carbonic acid diester containing a large mount of metallic elements in the melt polymerization method.

There are various causes of contamination of such metallic elements, and, for example, a case in which the materials of the reaction facilities for producing the carbonic acid diester are dissolved and mixed, and the catalyst, etc., used in the production of the carbonic acid diester, etc., are exemplified.

The inventors of the present invention, found out that discoloration and reduction of the transparency, clouding, etc. of the carbonic acid diester and the aromatic polycarbonate become especially evident when the metallic element component exists together with the nitrogen-containing compound in the carbonic acid ester. As the metallic elements inducing such deteriorations, iron, tin, chromium, titanium and copper elements are exemplified as particularly exhibiting ill effects.

If these metallic elements and 5 ppm or more of the nitrogen-containing compound impurity exist, interaction between the metallic elements and the nitrogen-containing compound will occur so that the degree of discoloration and especially diversified magnitudes of discoloration become noticeable. In the case that the metallic elements present in excess of 1 ppm, the degree of the discoloration and especially diversified magnitudes of discoloration become further more noticeable, so that some of the obtained aromatic polycarbonate can hardly be a product for merchandising.

It is necessary to limit each of such metallic elements at 0.5 ppm or less, preferably at 0.3 ppm or less, and more preferably at 0.1 ppm or less.

Further, as to the metallic elements, it is preferable to limit the total amount of iron, tin, chromium, titanium and copper at 0.5 ppm or less, more preferably at 0.3 ppm or less and further more preferably at 0.1 ppm or less.

Further, as to the metallic elements, it is preferable to limit the total amount of the all metallic elements at 0.5 ppm or less, more preferably at 0.3 ppm or less, and further more preferably at 0.1 ppm or less.

Besides these metallic elements, a salicylic acid derivative in the carbonic acid diester can also be a cause of discoloration and diversified magnitudes of discoloration. The salicylic acid derivative induces discoloration and diversified magnitudes of discoloration, and especially exhibits severe ill effect if it exists together with the nitrogen compounds and the metallic element components. As the salicylic acid derivative, salicylic acid, methyl salicylate and phenyl salicylate are exemplified.

Though it is rather rare for a salicylic acid derivative to be detected in a significant amount (for example by 1 ppm) in a usual carbonic acid diester, it will render a worse effects to the quality of the carbonic acid diester even in a trace amount, if the above nitrogen-containing compound is also present, and if further the above metallic elements coexist.

To suppress such bad effects, it is necessary to limit the content of the salicylic acid at 10 ppm or less, more preferably at 5 ppm.

As to carbonic acid diester as the raw material carbonic acid diester obtained by a publicly known processes is sufficient, not limited by its production process.

As the purification for obtaining carbonic acid diester having a impurity content suppressed at a specific value or less in the present invention, it is difficult to obtain the above quality by simply combining the publicly known methods.

As the preferable method for the purification of the carbonic acid diester, for example, a method for dissolving the above raw material carbonic acid diester in a non-polar solvent, (1) treating with a hydrotalcite, separating the crystals of the carbonic acid diester, then exchanging the solvent with a polar solvent, (2) treating with a strongly basic ion exchange resin, (3) treating with a strongly acidic ion exchange resin, (4) treating with an activated carbon, and then (5) distilling under a reduced pressure and/or recrystllizing, is exemplified.

The most important points of the above purification method are to treat with the hydrotalcite in a non-polar solvent, to treat with the two kinds of the ion exchange resins in a polar solvent, and to perform the activated carbon treatment.

The hydrotalcite is a name of a mineral including a natural and a synthetic substances, and expressed as $Mg_6Al_2(OH)_{16}CO_3.4H_2O$, and is a layered compound wherein the crystal structure has, as a base layer, a structure in which part of the Mg of $Mg(OH)_2$ is replaced with Al, and, as a middle layer, a negatively charged layer ($CO_3.4H_2O$) to maintain electrical neutrality by neutralizing the positive charge.

Since a hydrotalcite-like compound somewhat different from the natualhydrotalcite is sold under a merchandise number DHT-4A ($Mg_{4.5}Al_2(OH)_{13}CO_3.3H_2O$) and this substance also has basically the similar activity, both the natural hydrotalcite and synthesized hydrotalcite-like compounds will be simply called as hydrotalcite hereinafter.

For the treatment of the raw material carbonic acid diester with the hydrotalcite, publicly known solid-liquid contacting type reaction forms including a batch type, a continuous type or the form of their combinations, are preferably used. And also, the following contact treatments of the carbonic acid diester with ionic exchange resins are also preferably performed in the similar methods as above.

As the non-polar solvents, a hydrocarbon, for example an aromatic hydrocarbon such as benzene, toluene, xylene, mesitylene, methylnaphthalene, tetrain, chlorobenzene, etc., and an aliphatic hydrocarbon such as heptane, octane, cyclohexane, etc., are exemplified. Among them, a low boiling point aromatic hydrocarbon having a boiling point of 200° C. or lower such as benzene, toluene, xylene, etc., are preferable.

As the polar solvents, an alcohol; for example a monohydric alcohol such as methyl alcohol ethyl alcohol, i-propyl alcohol, n-butyl alcohol, etc., and a polyhydric alcohol such as ethylene glycol, 1,4-butane diol, glycerol etc., a ketone and an ether for example acetone, methyl ethyl ketone, acetophenone, dibutyl ether, diphenyl ether, etc., an ester, for example, ethyl acetate, butyl acetate, etc., and acetonitrile, nitromethane, etc., are exemplified as preferable substances.

In the present invention, it is preferable to use facilities made of a stainless alloy containing specific amounts of niobium and/or vanadium as the facilities used for the production of the polymer. More particularly, the contents of niobium and/or vanadium in the stainless alloy are preferably from 10 to 1,000 ppm, and more preferably from 20 to 500 ppm. More limitedly speaking, it is preferable that the total content of niobium and/or vanadium contained in the stainless alloy within 1 mm thickness from the surface is from 10 to 1,000 ppm, and more preferably from 20 to 500 ppm. If the niobium and/or vanadium contents are larger than 1,000 ppm, they give an ill effect to the hue of the polymer and if they are less than 10 ppm, then it is not preferable since it is difficult to obtain the effect of suppressing the generation of the foreign materials.

As to the part in the reaction facilities to which such specific material is applied, there is no particular limitation where it is, if it is a part constituting the reaction facilities. However, it is effective to apply to the reaction vessel, and it is preferable to apply such material having the specific material quality to a part directly making a contact with the polycondensate ranging from the monomer to the polymer and a substance produced as a byproduct in the ester exchange such as pheno. It is also preferable to apply a material with such specific quality to the lower part of the distillation column, and the piping part through which the polymer (oligomer) flows.

The existing amount of these niobium and/or vanadium in the stainless alloy can be measured using an elemental analysis of metals, a surface assessment method such as X-ray fluorescent analysis, etc.

As to the stainless alloy containing these niobium and/or vanadium, there is no particular limitation if it is a stainless alloy consisting mainly of usual iron and having nickel and/or chromium which also comprises niobium and/or vanadium. Among them, an austenite-based stainless steel which is also called 18-8 stainless steel is preferable. SUS 302, SUS 304, SUS 304, SUS 309S, SUS 310S, SUS 316, SUS 316L, SUS 317, SUS 321, SUS 347, etc. can be exemplified. Among them, SUS 304 and SUS 316 are preferable. In order to add niobium and/or vanadium to them, it is possible to add the specified metal to a molten steel, or add to the steel by using methods such as ion etching and vapor deposition.

The foreign materials mentioned here, although the cause of the generation and the process of generation are not clear, are black foreign materials created by carbonizing a polycondensate such as the monomer, the polymer, a byproduct produced by the reaction, etc., and gel state foreign materials, created by highly cross-linking the polymer. The sizes of them are approximately 10 $\mu$m or larger in diameter and can be observed through a magnifying apparatus such as a microscope. In the case of the black foreign materials, a main constituting element is in many cases carbon, and they are in many cases generated at the upper part of the ester interchange reaction vessel. It is supposed that the byproducts such as phenol and the splashed polymer, oligomer and monomer are thermally decomposed to become the foreign materials. In the case of gel state foreign materials, they are not dissolvable in dichloromethane and can be observed as emitting white to yellow to brown colors under an ultraviolet lamp. The number of these foreign materials can be examined by dissolving the obtained polymer in an organic solvent such as dichloromethane and then filtering with a filtering membrane such as a Millipore filter.

As mentioned above, by applying a stainless alloy comprising niobium and/or vanadium to the reaction vessel of the production of the aromatic polycarbonate, it becomes clear that it is effective to reduce the foreign materials in the produced aromatic polycarbonate. The reason thereof is considered to be that the activity of the ester interchange catalyst is stabilized.

As to the problems of material quality of the facilities, as a result of the eager effort by the inventors of the present invention for solving the above problems, it was found out that it is possible to produce a high-quality aromatic polycarbonate having a reduced amount of foreign materials represented by the fine foreign materials by forming a specific oxide film layer at the inside surface of part or the whole of the reaction facilities used for the production to complete the present invention. The content of the invention is described as follows.

In the present invention, the facilities used for producing the aromatic polycarbonate mean all of the reaction apparatuses used for the whole processes of the production of the aromatic polycarbonate, the pipings joined thereto, etc., and there is no particular limitation to the shapes, sizes and kinds thereof.

The reaction facilities used for the production of the aromatic polycarbonate have a specific oxide film layers as described later formed at part or the whole of the inside wall surface of them, preferably at part of which contacts with the raw materials, the polymerization intermediates, the polymer after completion of the polymerization, the byproducts produced by the reaction and various additives such as the catalyst, the stabilizer, etc. added during the processes.

As the preferable part to form the specific oxide film layer on, the polymerization vessel for performing the polymerization by the ester interchange method, pipings for transporting the molten state polymer, a double screw extruder, a polymer filter and a casing thereof are exemplified.

There is no particular limitation to the metallic materials used for these facilities and materials having any quality can be used, but it is preferable to use an inexpensive material having excellent processing properties such as a stainless alloy. The stainless alloy mentioned here, is an alloy consisting of iron, nickel and chromium as main components and among them, an austenite-based stainless alloy, also called as a 18-8 stainless steel, is preferably used.

SUS 302, SUS 304, SUS 304L, SUS 309, SUS 309S, SUS 310, SUS 310S, SUS 316, SUS 316L, SUS 317, SUS 321, SUS 347, etc., can be exemplified. Among them, SUS 304 and SUS 316 are preferably used in view of the availability and excellent processing properties. There is no particular limitation in the range of the present invention in using a hard type stainless alloy such as a hastelloy.

The present invention is characterized in that a specific oxide film layer is formed at part or the whole of the inside surfaces of the facilities made of the above materials, wherein the specific oxide film layer consists of iron oxide as a main component and has a thickness of at least 10 nm or more, preferably 20 nm or more.

In the present invention, it is possible to reduce foreign materials represented by the fine foreign materials effectively by forming the oxide film layer consisting of mainly iron oxide and chromium oxide, at least 10 nm or more, preferably 20 nm or more in thickness. These oxide film layers can be measured by an Auger electron spectroscopy of the above metal surface.

The expression "oxide film layer consisting mainly of iron oxide and chromium oxide" means that the iron oxide and the chromium oxide are present at a concentration of 50 weight % or higher, preferably 60 weight % or higher, based on the whole oxide film layer.

As components which are allowed to be contained in the oxide film layer other than the iron oxide and chromium oxide, exemplified are nickel, silicon and carbon. Though there is no particular limitation to the content, it is preferably 30 weight % or lower.

As to a method to form the above oxide film layer, any publicly known method can be applied. In the case of a material comprising iron as a main component, concrete examples are a heat-treating method, a method to make contact with various chemicals, etc. but not particularly limited to these methods. In the case of using a stainless alloy, it is preferable to use a method to form an oxide film layer by baking. The temperature is preferably 300° C. or higher, more preferably 320° C. or higher.

Regarding the baking time, there is no particular limitation to it only if the oxide film layer of the iron oxide has a thickness of 10 nm or more, preferably 20 nm or more. There is also no particular limitation to the concentration of oxygen, nitrogen and steam used for the baking, only if the desired oxide film layer is obtained. As the chemicals, various acids and liquids containing the same, for example, an aqueous solution of nitric acid, a chemical containing an oxidizing agent such as 6-valent chromium, etc., can be employed.

In the present invention, it is preferable to form the above oxide film layer on the whole inside surfaces of the facilities. In view of suppressing the cost on the pre-treatment of the facilities and obtaining efficiently an aromatic polycarbonate having a high quality, it is preferable to use facilities having the above film layer formed on the parts which contact with the reaction mixtures such as oligomers and polymers, and the byproducts produced by the reaction (for example, phenol produced by the ester interchange reaction). Further, it is more preferable to use facilities having the above film layer formed on the parts which contact with a polymer having a higher degree of polymerization.

The foreign materials represented by the fine foreign materials in the aromatic polycarbonate mentioned in the present invention, do not mean dust or rubbish entering from the outside, but foreign materials represented by the fine foreign materials generated during the production of the polymer, and the above specific facilities described in the invention exhibit an effect in reducing them. There are various foreign materials generated during the processes, and the above facilities exhibit its effect in reducing the fine gel state foreign materials among them.

The fine gel state foreign material mentioned here, means a material not dissolved in dichloromethane, which, when a dichloromethane solution of an aromatic polycarbonate is filtered with a filter, remains on the filter as viewed to be semi-transparent to transparent under an observation with a magnifying glass, etc., and emitting a light on irradiating of ultraviolet rays having a spectrum centered at 340 nm. Further in detail, it gives a spectrum resembling that of the aromatic polycarbonate on measuring by an infrared microspectrophotometery, etc. It is considered that the gel is formed by a branched structure formation of the aromatic polymer caused by some change in its chemical structure in the molten state.

The sizes of the fine gel state foreign materials vary widely, but in many cases they are between 100 and several $\mu$m in diameter. It is often difficult to judge whether a material is a gel state foreign material or not if it is smaller than that.

The branched structure is not completely elucidated and is considered to involve several reactions in a complicate way. Specifically for example, it is known that structures resembling to those described in the Journal of Applied Polymer Science, volume 52, pages 1549 to 1558, 1994 by Rufs et al. are formed.

Further, in the production method disclosed in the present invention, it is preferable to block the terminal hydroxyl group of the polymer by using a terminal blocking agent described in Japanese Unexamined Patent Publication Hei 10-36497 filed by the inventors of the present invention.

In the present invention, it is preferable, in view of the reaction rate, to control the hydroxyl terminal group of the aromatic polycarbonate before the addition of a terminal blocking agent to 75 to 35 mole %, preferably 70 to 40 mole %, and more preferably 60 to 40 mole % based on the whole terminal groups. Thereby, it is possible to control the terminal hydroxyl group at the final stage at a low level so that the modification effect of the polymer is enhanced.

Here, the molar amount of the terminal hydroxyl group in a given amount of the polymer can be determined e.g. by 1H-NMR method. The ratio of the hydroxyl terminal group in the polymer can also be controlled by the charging ratio of the aromatic diol to carbonic acid diester as raw materials.

As described previously, for example, in the case of producing an aromatic polycarbonate using bisphenol A (in the present invention, it is also called as "BPA") as an aromatic diol compound and diphenyl carbonate (in the present invention, it is also called as "DPC") as a carbonic acid diester, the formula for the production reaction is expressed as follows;

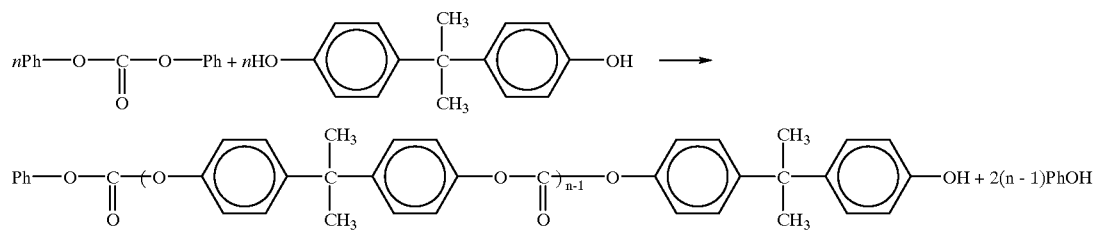

The PhOH (phenol) expressed in the above formula is removed to the outside of the system by an operation such as evacuation, etc., and the aromatic polycarbonate expressed by the following formula is produced.

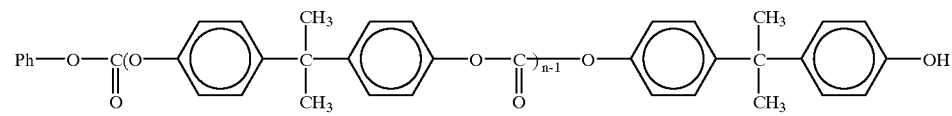

One of the terminals of the aromatic polycarbonate molecule expressed by the above formula has an aromatic hydroxyl group. It is publicly known that the aromatic hydroxyl terminal group is not preferable for the short-term and long-term stability of the produced aromatic polycarbonate. For example, in Japanese Patent Publications Sho 61-87724 and 61-87725 (G.E. company, Ltd.), it is reported that the polymer stability indicated by the decrease of degree of lowering of the intrinsic viscosity at a aging test heated at a temperature of 250° C. for 15 hr, can be enhanced by reducing the terminal hydroxyl groups. However, the aromatic hydroxyl group existing at one of the terminals of a molecules as is expressed in the above formulae is an essential active point in the production of the aromatic polycarbonate produced by the melt polymerization method.

The inventors of the present invention have developed a method in which, while the essentially necessary number of the terminal hydroxyl groups is maintained during the production of a aromatic polycarbonate, the number is decreased to a desired value after the degree of polymerization (intrinsic viscosity) of the aromatic polycarbonate reached a desired value.

That is, for example, after the intrinsic viscosity has attained at least 0.3 dl/g, a compound expressed by the following formula (2)

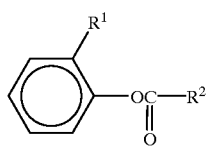

(2)

(wherein $R^1$ is a chlorine atom, a methoxycarbonyl group or an ethoxycarbonyl group; $R^2$ is an alkyl group having a carbon number of 1 to 30, an alkoxyl group having a carbon number of 1 to 30, an aryl group having a carbon number of 6 to 30 or an aryloxy group having a carbon number of 6 to 30) is added to obtain a terminal group-blocked aromatic polycarbonate.

The compound used in the present invention expressed by the above formula (2), includes a carbonate and a carboxylic acid ester depending on the definition of the $R^2$.

In the formula (2), $R^1$ is a chlorine atom, a methoxycarbonyl group ($CH_3OCO$) or an ethoxycarbonyl group ($C_2H_5OCO$), and among them, a chlorine atom and a methoxycarbonyl group are preferable and a methoxycarbonyl group is especially preferable.

Further, $R^2$ is an alkyl group having a carbon number of 1 to 30, an alkoxyl group having a carbon number of 1 to 30, an aryl group having a carbon number of 6 to 30 or an aryloxy group having a carbon number of 6 to 30, and the alkyl group having a carbon number of 1 to 30 can be either linear, branched or cyclic. It can also have an unsaturated group. As such an alkyl group, a linear alkyl group such as methyl group, ethyl group, n-propyl group, n butyl group, n-pentyl group, n-hexyl group, noctyl group, n-nonyl group, n-dodecyl group, n-lauryl group, n-palmityl group, stearyl group, etc.; a branched alkyl group such as isopropyl group, t-butyl group, 4-butylnonyl group, etc.; an alkyl group having an unsaturated group, i. e., an alkenyl group such as allyl group, butenyl group, pentenyl group, hexenyl group, dodecenyl group, oleyl group, etc.; and a cycloalkyl group such as cyclopentyl group, cydohexyl group, etc., are exemplified. Among them, in view of improved mold releasing property of the polymer, a long chain alkyl group, more specifically, a lauryl group, a stearyl group and a dodecenyl group are especially preferable.

The alkoxyl group having a carbon number of 1 to 30 can also be either linear, branched cyclic, and can also have an unsaturated group. As such an alkoxyl group, a linear alkoxyl group such as methoxy group, ethoxy group, n-propoxy group, n-butoxy group, n-pentoxy group, n-hexyloy group, n-octyloxy group, n-nonyloxy group, n-dodecyloxy group, n-lauryloxy group, n-palmityloxy group and n-stearyloxy group; a branched chain alkoxy group such as isopropoxy group, t-butoxy group, and 4-butylnonyloxy group; an alkoxy group having an unsaturated group such as allyloxy group, butenyloxy group, pentenyloxy group, hexenyloxy group, dodecenyloxy group, and oleyloxy group; and a cycloalkyloxy group such as cyclopentyloxy group, cyclohexyloxy group, etc. are exemplified. Among them, in view of the improved mold releasing property of the polymer, a long chain alkoxyl group, for example, lauryloxy group, stearyloxy group and dodecenyloxy group are especially preferable.

The alkyl groups having a carbon number of 1 to 30 and the alkoxy groups having a carbon number of 1 to 30 can have a methoxycarbonyl, ethoxycarbonyl, an (o-methoxylcarbonylphenyl)oxycarbonyl,

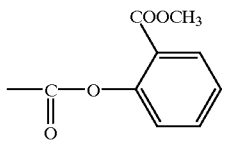

or an (o-ethoxycarbonylphenyl)oxycarbonyl group as a substituent.

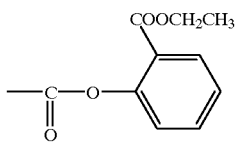

As the aryl group having a carbon number of 6 to 30, phenyl, naphthyl, biphenyl, anthranyl, etc., can be exemplified.

Also, as the aryloxy group having a carbon number of 6 to 30, phenoxy, naphthoxy, biphenyloxy, anthraoxy, etc., can be exemplified.

These aryl groups having a carbon number of 6 to 30 and aryloxy groups having a carbon number of 6 to 30 can have, as a substituent, methoxycarbonyl, ethoxycarbonyl, (o-methoxycarbonylphenyl)oxycarbonyl, (o-ethoxycarbonlyphenyl)-oxycarbonyl, an alkyl group having a carbon number of 1 to 30 or an alkoxyl group having a carbon number of 1 to 30. As the alkyl groups having a carbon number of 1 to 30 and the alkoxyl group having a carbon number of 1 to 30, the same groups as shown in the above example groups can be exemplified.

The compounds expressed by the above formula (2) can be classified, for convenience sake, based on the definition of the $R^2$, into a carbonate compound expressed by the following formula (2)-1,

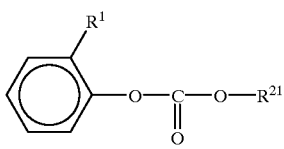
(2)'

{wherein $R^1$ is a chlorine atom, a methoxycarbonyl group or an ethoxycarbonyl and $R^{21}$ is an alkyl group having a carbon number of 1 to 30 or an aryl group having a carbon number of 6 to 30, where the alkyl group having a carbon number of 1 to 30 can have, as a substituent, methoxycarbonyl, ethoxycarbonyl, (o-methoxycarbonylphenyl)oxycarbonyl or (o-ethoxycarbonylphenyl)oxycarbonyl, and the aryl group having a carbon number of 6 to 30 can have, as a substituent, methoxycarbonyl, ethoxycarbonyl, (o-methoxycarbonylphenyl)oxycarbonyl, (o-ethoxycarbonylphenyl)oxycarbonyl, an alkyl group having a carbon number of 1 to 30 or an alkoxyl group having a carbon number of 1 to 30} and a carboxylic acid arylester expressed by the following formula (2)-2

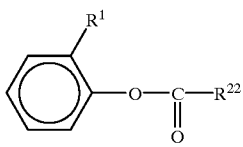
(2)-2

{wherein $R^1$ is a chlorine atom, a methoxycarbonyl group or an ethoxycarbonyl and $R^{22}$ is an alkyl group having a carbon number of 1 to 30, an alkoxyl group having a carbon number of 1 to 30, an aryl group having a carbon number of 6 to 30 or an aryloxy group having a carbon number of 6 to 30, where the alkyl groups having a carbon number of 1 to 30 and the alkoxyl groups having a carbon number of 1 to 30 can have, as a substitutent, methoxycarbonyl, ethoxycarbonyl, (o-methoxycarbonylphenyl)oxycarbonyl or (o-ethoxycarbonylphenyl)oxycarbonyl, and the aryl groups having a carbon number of 6 to 30 and the aryloxyl group having a carbon number of 6 to 30 can have, as a substitutent, methoxycarbonyl, ethoxycarbonyl, (o-methoxycarbonylphenyl)oxycarbonyl, (o-ethoxycarbonylphenyl)oxycarbonyl, an alkyl group having a carbon number 1 to 30 or an alkoxyl group having a carbon number of 1 to 30}.

As the compounds expressed by the formula (2), 2-methoxycarbonylphenyl benzoate, 4cumylbezic acid (2'-methoxycarbonylphenyl)ester, 2-ethoxycarbonylphenyl benzoate, 4(o-methoxycarbonylphenyl)oxycarbonylbenzoic acid (2'-methoxycarbonylphenyl)ester are especially preferable.

In the present invention, the compound expressed by the above formula (2) is added to the aromatic polycarbonate, and reacts with the terminal OH (—OH) of the aromatic polycarbonate to block the aromatic polycarbonate terminals as shown in the following reaction formula. In order to perform the terminal blocking reaction quickly and in a high yield, it is preferable to conduct the reaction while distilling the produced 2-substituted phenol off.

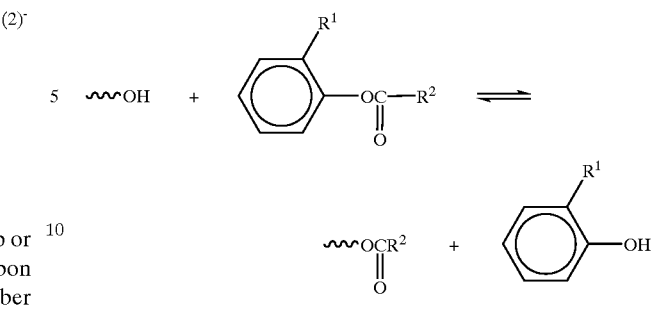

The compound expressed by the above formula (2) is added after the melt polycondensation of the aromatic diol with the diphenyl carbonate is performed until the intrisic viscosity of the aromatic polycarbonate reaches at least 0.3 dl/g. Since the terminal blocking reaction of the aromatic polycarbonate progresses rapidly after the addition, the change of the intrinsic viscosity of the aromatic polycarbonate remains within the range of 0.1 dl/g so that it is possible to suppress the concentration of the terminal hydroxyl group at a level as low as from 0 to 30 mole %.

The compound expressed by the above formula (2) is used at a ratio of preferably 0.5 to 2 mole, more preferably 0.7 to 1.5 mole and especially preferably 0.8 to 1.2 mole based on 1 equivalent of the terminal hydroxyl group of the aromatic polycarbonate.

The concentration of the terminal hydroxyl group is preferably measured and confirmed each time preceding the addition of the blocking agent. In a case wherein the polycondensation is conducted continuously under one constant same polycondensation condition, the concentration of the terminal hydroxyl groups obtained at the preceding polycondensation may be used as it is for convenience' sake.

To perform the above terminal blocking reaction, it is necessary to use a catalyst, and the catalyst used in the polycondensation reaction can be used preferably as it is.

It is especially preferable to conduct the terminal blocking reaction at the point when the polycondensation of the aromatic polycarbonate is completed and the polymer is still in a molten state. Therefore, the point when the terminal blocking reaction is conducted must be chosen after the completion of the polycondensation and before the addition of a sulfonic acid-based compound. The terminal blocking reactions can be performed preferably at the above mentioned point.

Even after the completion of the polycondensation of the aromatic polycarbonate and after the addition of the sulfonic acid-based compound, it is possible to perform the terminal blocking reaction similarly by newly adding a catalyst for use in the terminal blocking reaction into the aromatic polycarbonate.

In the present invention, it is advantageous to suppress the amount of free chlorine not covalently bonded with the polymer as low as preferably 50 ppm or less, more preferably 5 ppm or less in the aromatic polycarbonate before blocking the terminal groups (prepolymer).

If the amount of the free chlorine is larger than the above amount, it is not preferable since the catalyst activity involved in the terminal blocking reaction is apt to be reduced, and then the blocking of the terminals can not be achieved rapidly and sufficiently.

If the amount of the chlorine is large, it is also not preferable since it gives ill effects on the hue and stability of the obtained polymer. Suppression of the amount of chlorine contained in the pre-polymer is attained by suppressing the amount of chlorine in the raw materials at a low level.

In the present invention, it is also advantageous to suppress the amount of iron contained in the aromatic polycarbonate before the blocking of the terminals at 1 ppm or less, more preferably 0.7 ppm or less.

If the amount of iron is larger than 1 ppm, it is not preferable since the catalyst activity involved in the terminal blocking reaction is apt to be reduced, and then the blocking of the terminal can not be achieved rapidly and sufficiently. If the amount of the iron is large, it is also not preferable since it gives ill effects on the hue and stability of the obtained polymer.

The suppression of the iron content at a low level is attained by suppressing the amount of iron contained in the raw materials and preventing contamination by iron over the whole processes of the production.

After the addition of the terminal blocking agent, a reduced pressure condition is preferable for removing the phenols produced by the reaction. Specifically it is preferable to have 50 Torr or less, more preferably 10 Torr or less. Usually, it is preferable to conduct the removal at a pressure within a range of 0.01 to 100 Torr.

The reaction temperature after the addition of the terminal blocking agent is usually within a range of 250 to 360° C., preferably 260 to 340° C. The polymer does not melt at a lower temperature than this range, and a temperature higher than the above range is not preferable since the polymer is decomposed and discolored. The reaction time is usually 1 to 30 minutes, preferably 1 to 20 minutes, and can be 1 to 15 minutes as is desired.

In the present invention, it is possible to suppress the remaining phenols contained in the polymer at a low level after the terminal thereof is blocked.

The concentration of the remaining phenols in the polymer after the blocking of the terminal group, is 300 ppm or less, preferably 200 ppm or less. If the remaining phenols exist more than this concentration, it is not preferable since the molecular weight lowering and discoloration are apt to occur.

Once the intrinsic viscosity of the polymer reaches 0.3 dl/g, the terminal blocking agent can be added, either all at once or dividedly in several portions. That is, it is desirable that the terminal blocking agent is added after the intrinsic viscosity attains at least 0.3 dl/g.

Further, according to the research by the inventors of the present invention, it is elucidated that one mole of some kind of compounds including the specific compounds among the compounds expressed by the above formula (2) can block two molecules of the aromatic polycarbonate, having a function to markedly improve the degree of polymerization of the aromatic polycarbonate, i. e., a function to accelerate the polymerization.

Therefore, the present invention, secondly, provides a method for producing an aromatic polycarbonate having an increased intrinsic viscosity by performing the melt polycondensation of an aromatic diol with a diphenyl carbonate, characterized in that a compound expressed by the following formula (7)

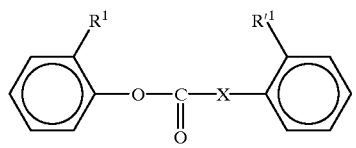

(7)

{wherein, $R^1$, $R'^1$ are each a chlorine atom, a methoxycarbonyl or an ethoxycarbonyl; X is an oxygen atom or a group expressed by the following formula:

—R″—COO—

(where, R″ is an alkylene group having a carbon number 1 to 30 or an arylene group having a carbon number of 6 to 30)) is added after the intrinsic viscosity the aromatic polycarbonate reaches at least 0.3 dl/g to form an aromatic polycarbonate having an intrinsic viscosity higher than that at the time of the addition by more than 0.1 dl/g in intrinsic viscosity.

The polymerization accelerating agent expressed by the above formula (7), is added to the aromatic polycarbonate with the intrinsic viscosity having reached at least 0.3 dl/g so that an aromatic polycarbonate having an intrinsic viscosity higher than that at the time of the addition by more than 0.1dl/g can be obtained.

The polymerization accelerating agent expressed by the above formula (7), is added at a ratio of preferably approximately 0.3 to 0.7 mole, more preferably approximately 0.4 to 0.6 mole, especially preferably approximately 0.45 to 0.55 mole based on 1 equivalent of the terminal hydroxyl group at the time of addition.

A polymerization accelerating agent is added to the aromatic polycarbonate and reacts with the terminal OH (—OH) of the aromatic polycarbonate to perform a coupling of two molecules of the aromatic polycarbonate as shown in the following reaction formula.

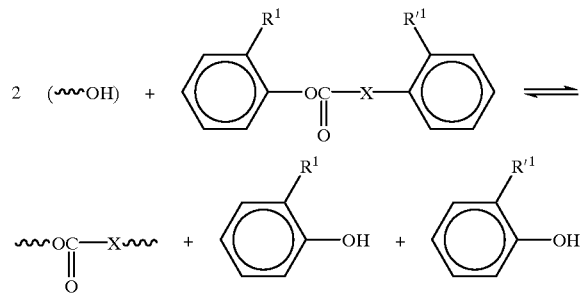

As the reaction produces as shown in the above reaction formula, two molecules of 2-substituted phenol, it is preferable to do the reaction while distilling the produced 2-substituted phenol off in order to perform the coupling rapidly and in a high yield.

At the time of completion of the coupling, an aromatic polycarbonate having preferably an intrinsic viscosity of more than 0.4 and less than 1.0 dl/g, more preferably the intrinsic viscosity of 0.45 to 0.8, is formed.

To the aromatic polycarbonate obtained in the present invention, it is possible to add a catalyst inactivating agent.

As the catalyst inactivating agent used in the present invention, publicly known catalyst inactivaters can be used effectively, but among them an organosulfonic acid salt such as an ammonium salt of a sulfonic acid, a sulfonic acid derivatives such as an organosulfonic acid ester, an organosulfonic acid anhydride, an organosulfonic acid betaine, and a phosphonium salt are preferable, and more specifically, at least one kind of sulfonic acid phosphonium compound selected from the group consisting of compounds expressed by the general formulae (3) to (6) is preferably used.

$$A^1-(Y^1-SO_3X^1)_m \quad (3)$$

{wherein, $A^1$ is a m-valent hydrocarbon group with or without a substituting group, $Y^1$ is a single bond or oxygen atom, $X^1$ is a secondary or a tertiary monovalent hydrocarbon group, a mono equivalent metallic cation, an ammonium cation or a phosphonium cation, and m is an integer from 1 to 4, provided that when $Y^1$ is the single bond, not all of the m $X^1$'s are mono equivalent metallic ion}

$$^+X^2\text{—}A^2\text{—}Y^1\text{—}SO_3^- \tag{4}$$

{wherein, $A^2$ is a divalent hydrocarbon group, $^+X^2$ is a secondary to quaternary ammonium cation or a secondary to quaternary phosphonium cation, and the definition of $Y^1$ is the same as that in the above formula (3)}

$$A^3\text{—}(^+X^3)_n\cdot(R\text{—}Y^1\text{—}SO_3^-)_n \tag{5}$$

{wherein, $A^3$ is a n-valent hydrocarbon group, $^+X^3$ is a secondary to quaternary ammonium cation or a secondary to quaternary phosphonium cation, R is a monovalent hydrocarbon group, n is an integer from 2 to 4, and the definition of $Y^1$ is the same as that in the above formula (3)}

$$A^5\text{—}Ad^1\text{—}A^4\text{—}(Ad^2\text{—}A^5)_k \tag{6}$$

{wherein, $A^5$ is a mono- or divalent hydrocarbon group, $A^4$ is a divalent hydrocarbon group, $Ad^1$ and $Ad^2$ are each, same or different, an acid anhydride selected from group consisting of —$SO_2$—O—$SO_2$—, —$SO_2$—O—CO— and —CO—O—$SO_2$— and k is 0 or 1, provided that when the k is 0, —$(Ad^2\text{—}A^5)_k$ expresses hydrogen or a bond for bonding $A^4$ with $A^5$ (in that case, $A^5$ is either a divalent hydrocarbon group or a single bond.)} Further, the above salts of dodecylbenzene sulfonic acid such as dodecylbenzene sulfonic acid tetrabutyl phosphonium salt, etc., and the above salts of para- toluene sulfonic acid such as para-toluene sulfonic acid tetrabutyl ammonium salt, etc., are preferable. Also, as an ester of the sulfonic acid, methyl benzenesulfonate, ethyl benzenesulfonate, butyl benzenesulfonate, octyl benzenesulfonate, phenyl benzenesulfonate, methyl para-toluenesulfonate, ethyl para-toluenesulfonate, butyl para-toluenesulfonate, octyl para-toluenesulfonate, phenyl para-toluenesulfonate, etc., are used. Among them, dodecyl benzenesulfonic acid tetrabutyl phosphonium salt is most preferably used.

Addition of such a catalyst inactivating agent to the polymer inactivates the catalyst rapidly so that the desired stabilized polymer can be obtained. By applying the catalyst inactivating agent singly or together with a phosphite ester-based compound or a phenolic antioxidant, an aromatic polycarbonate having an increased stability is obtained. Among the catalyst inactivating agents in the above formulae (3) to (6), a phosphonium salt or an ammonium salt type catalyst inactivating agent are preferable since they themselves are stable at a temperature of 200° C. or higher.

In the present invention, at least one kind of the catalyst inactivating agent selected from the group consisting of those expressed by the above formulae (3) to (6) is used in an amount of $1\times10^{-6}$ to 0.1 parts by weight, preferably $1\times10^{-6}$ to 0.05 parts by weight and more preferably $1\times10^{-6}$ to 0.03 parts by weight based on 100 parts by weight of the produced aromatic polycarbonate, after the completion of the aromatic polycarbonate melt polycondensation or after the terminal blocking reaction. Regarding the ratio to the alkali metal ester interchange catalyst, such a catalyst inactivating agent is also preferably used at a ratio of 0.5 to 50 mole based on 1 mole of the ester interchange catalyst.

An organic phosphonium salt or an ammonium salt of a sulfonic acid described in Japanese Unexamined Patent Publication Hei 8-59975, are also used preferably.

The used amount of such a catalyst inactivating agent is at a ratio of 0.5 to 50 mole, preferably 0.5 to 10 mole and more preferably 0.8 to 5 mole based on 1 mole of the above polymerization catalyst selected from the group consisting of alkali metal compounds and/or alkaline earth metal compounds.

Such a catalyst inactivating agent can be added, directly or by dissolving or dispersing in a suitable solvent, into the molten state aromatic polycarbonate to be kneaded. There is no limitation to the apparatus used for such an operation. Extruders such as a double screw extruder are preferably used. A double screw extruder with venting is especially preferable for use when a catalyst inactivating agent is dissolved or dispersed in a solvent.

It can also be added after the re-melting of a once-pelletized aromatic polycarbonate. Thereby, it is possible to stabilize the aromatic polycarbonate produced using the ester interchange catalyst and also effectively prevent soiling of a mold used for injection molding.

Also, in the present invention it is possible to add various additives into the aromatic polycarbonate as long as they do not hurt the object of the present invention. The additives are preferably added, in the same way as in the case of the catalyst inactivating agent, to the molten state aromatic polycarbonate, and as such additives, a processing stabilizer, heat resistant stabilizer, antioxidant, photostabilizer, ultraviolet-ray absorbing agent, metal inactivator, metallic soap, nucleating agent, antistatic agent, lubricant, flame retardant, mold releasing agent, fungicide, coloring agent, anti-cloud agent, natural oil, synthetic oil, wax, organic filler, inorganic filler, epoxy compound, slip agent, anti-blocking agent, etc., can be exemplified.

Among them, the heat resistant stabilizer, ultraviolet-ray absorbing agent, mold releasing agent, coloring agent, etc. are very commonly used. Two kinds or more of them can be combined for use.

As the heat resistant stabilizer used in the present invention, a phosphorus compound, a phenolic stabilizer, an organic thioether-based stabilizer, a hindered amine-based stabilizer, etc., can be exemplified.

As the preferable phosphorus compound, a phosphate ester, and/or a phosphite ester derivatives are used.

As a specific example of these stabilizers, an arylalkyl phosphite such as bis(2,4-di-t-butylphenyl)pentaeythrityl diphosphite, bis(2,6-di-t-butyl-4-methylphenyl) pentaerybrityl diphosphite, bis(nonylphenyl)pentaerythrityl diphosphite, diphenyl decyl phosphite, diphenyl isooctyl phosphite, phenyl dioctyl diphosphite, 2-ethylhexyl diphenyl phosphite, etc.; a tialkyl phosphite such as trimethyl phosphite, triethyl phosphite, tributyl phosphite, trioctyl phosphite, trinonyl phosphite, tridecyl phosphite, trioctadecyl phosphite, distearyl pentaerythrityl diphosphite, etc.; a tiaryl phosphite such as triphenyl phosphite, tricresyl phosphite, tris(ethylphenyl)phosphite, tris(2,4-di-t-butylphenyl)phosphite, tris(nonylphenyl)phosphite, tris (hydroxyphenyl)phosphite, etc., an arylalkyl phosphate such as bis(2,4-di-t-butylphenyl)pentaeyrityl diphosphate, pentaerythrityl(2,4-di-t-butylphenyl)phosphate(2,4-di-t-butylphenyl)phosphite, bis(nonylphenyl)pentaeryrityl diphosphate, pentaerythrityl(nonylphenyl)phosphate, diphenyldecyl phosphate, diphenyl so-octyl phosphate, phenyl diiso-octyl phosphate, 2-ethyl hexyl diphenyl phosphate, etc.; a trialkyl phosphate such as distearyl pentaerytrityl diphosphate, pentaerythrityl stearyl phosphate stearyl phosphite, bis(tridecyl)pentaerythrityl diphosphate, pentaerythrityl tridecyl phosphate tridecyl phosphite, tris(2-chloroethyl)phosphate, tris(2,3-dichloropropyl)phosphate, etc.; a trialkyl phosphate such as trimethyl phosphate, triethyl phosphate, tributyl phosphate, trioctyl phosphate, trinonyl phosphate, tridecyl phosphate, trioctadesy phosphate, etc.; a triaryl phosphate such as triphenyl phosphate, tricresyl phosphate, tris(ethylphenyl)phosphate, tris(2,4-di-t-butylphenyl)phosphate, tris(nonylphenyl) phosphite, tris(hydroxyphenyl)phosphate can be exemplified but the present invention is by no means limited thereto.

These stabilizers can be used singly or combined to use and can be added at any step from polymerization to pelletizing.

Further as the ultraviolet-ray absorbing agent, common ultraviolet-ray absorbing agents are used. A salicylic acid-based ultraviolet-ray absorber, benzophenone-based ultraviolet-ray absorber, benzotriazole-based ultraviolet-ray absorber, cyanoacrylate-based ultraviolet-ray absorber, etc., can be exemplified.

Further, as the mold releasing agents, generally known mold releasing agents can be used. A hydrocarbon-based mold releasing agent such as a paraffin etc., a fatty acid-based mold releasing agent such as stearic acid, etc., a fatty acid amide-based mold releasing agent such as stearic acid amide, etc., an alcoholic mold releasing agent such as stearyl alcohol, pentaerythritol, etc., a fatty acid ester-based mold releasing agent such as glycerol monostearate, etc., a silicone-based mold releasing agent, etc., such as silicone oil, etc., can be exemplified.

As the coloring agents, an organic or an inorganic pigment and dye stuffs can be used.

There is no particular limitation to the way how these additives are added. For example, they can be added directly to the aromatic polycarbonate, or added by preparing master pellets.

As the processing stabilizers, 2-t-butyl-6-(3-t-butyl-2-hydroxy-5-methylbenzyl)-4-methylphenyl acrylate, 2-(1-(2-hydroxy-3,5-di-t-pentylphenyl)ethyl)-4,6-di-t-pentylphenyl acrylate, etc., are exemplified.

Further, as the phosphorus compound based antioxidant and the sulfur-based antioxidant, tris(nonylphenyl) phosphite, tris(2,4-di-t-butylphenyl)phosphite, bis(2,di-t-butylphenyl)pentaerythritol diphosphite, distearyl pentaerythritol diphosphite, tetrakis(2,4-di-t-butylphenyl)4,4-biphenylene diphosphite, 2,2'-ethylidene bis(4,6-di-t-butylphenyl)fluoro phosphite, 2,2'-methylene bis(4,6-di-t-butylphenyl)octyl phosphite, dilauryl-3,3'-thio dipropionate, dislearyl-3,3'-thio dipropionate, tetrakis(3-laurylthiopropionyloxymethyl)methane, etc., are exemplified.

As the photostabilizers, an ultraviolet-ray absorber including a benzotrile-based compound such as 2-(3-t-butyl-2-hydroxy-5-methylphenyl)-5-chlorobenzotriazole, 2-(3,5-di-t-butyl-2-hydroxyphenyl)benzotriazole, 2-(2-hydroxy-5-methylphenyl)benzotriazole, 2-(2-hydroxy-5-t-octylphenyl) benzotriazole, 2-(3,5-di-t-pentyl-2-hydroxyphenyl) benzotriazole, 2-(2-hydroxy-3-(3,4,5,6-tetrahydrophthalimide-methyl)phenyl)beniazole, 2-(2-hydroxy-3,5-bis(α,α-dimethylbenzyl)phenyl)-benzotriazole, etc., a benzophenone-based compound such as 2-hydroxy-4-otyloxybenzophenone, 2-hydroxy-4-methoxybenzophenone, etc., a hydroxybenzophenone-based compound such as 2,4-di-t-butylphenyl 3,5-di-t-butyl-4-hydroxybenzoate, etc., and a cyanoacrylate-based compound such as ethyl-2-cyano-3,3-biphenyl acrylate, etc., and a nickel-based quencher such as nickel dibutyldithiocarbamate, (2,2'-thio bis(4-t-octylphenolate))-2-ethylhexylamie nickel etc., are exemplified.

As the metal inactivaters, N,N-(3-(3,5-di-t-butyl-4-hydroxyphenyl)propionyl)hydrazine, etc., and as the metal soups calcium stearate, nickel sterate, etc. are exemplified.

Further, as the nucleating agents, sorbitol-based or a phosphate-based compounds such as sodium di(4t-butylphenyl)phosphonate, dibenzilidene sorbitol methylene bis(2,4-di-t-butylphenol)acid phosphate sodium salt, etc. are exemplified.

As the antistatic agents, quaternary ammonium salt-based or alkyiphosphate-based compounds such as (β-lauramidepropyl)trimethylammonium methylsulfate, etc., are exemplified.

As the lubricant, erucic acid amide, stearic acid monoglyceride, etc., and as the flame retardant, a halogen-containing phosphate ester such as tris(2-chlomethyl) phosphate, etc., a halogenated compound such as hexabromocyclo-dodecane, decabromophenyloxide, etc., a metallic inorganic compound such as antimony trioxide, antimony pentaoxide, aluminum hydroxide, etc., and their mixtures are exemplified.

There is no particular limitation to the specific procedures such as kinds, amounts, adding times, adding methods, etc., of these additives. It is preferable to have an apparatus for performing these operations made of the materials having the quality as is discosed in the present invention.

EXAMPLES

Examples of the present invention are shown below. These examples are for exemplifying the present invention and do not by no means limit the present invention. The physical properties of the obtained polycarbonate in the following Examples are measured as follows.

To be noted is that the Examples 1 to 3 are related to the invention wherein the pressure of the gas phase of the raw material melting vessel is kept at 0 MPa to 0.05 MPa, and compared with a Comparative Example 1, Examples 4 to 10 are related to the invention wherein the concentration of the nitrogen-containing basic compound in the reaction mixture is kept in a certain range and compared with Comparative Examples 2 to 6, Examples 11 to 13 are related to the invention wherein the specific byproduct, monohydroxyl compound is used and compared with Comparative Examples 7, 8, Examples 14 to 19 are related to the invention wherein the specific carbonic acid diester is used and compared with Comparative Examples 9 to 11, Examples 22 and 23 are related to the invention wherein the reaction facilities made of the specific quality material are used and compared with Comparative Example 12, Examples 24 to 26 are related to the invention wherein the reaction facilities having an oxide layer consisting mainly of iron oxide are used and compared with Comparative Examples 13 and 14, Examples 27 and 28 are compared with Comparative Example 15, Examples 29 and 30 are compared with Comparative Example 16, and Example 31 is compared with Comparative Example 17.

Further, in all the cases of the Examples 4 to 10 and the Comparative Examples 2 to 6, the viscosity-average molecular weight of the reaction mixture (1) and the amount of tetramethylammonium hydride (also called as TMAH in the desmption of the present invention) collected at the discharging port of the vertical agitating vessel agreed to the viscosity-average molecular weight of the reaction mixture and the amount of the TMAH collected at the inside of the vertical agitation vessel since the vertical agitation vessel for obtaining a reaction mixture (1) was essentially a completely mixed vessel. Further, since the vertical agitation vessel for obtaining the reaction mixture (2) was also essentially the completely mixed vessel, the viscosity-average molecular weight of the reaction mixture (2) and the amount of TMAH collected at the discharging port of the vertical agitation vessel agreed to the viscosity-average molecular weight of the reaction mixure and the amount of the TMAH collected at the inside of the vertical agitation vessel.

Intrinsic Viscosity and Viscosity-average Molecular Weight

Intrinsic viscosity was measured with a 0.7 g/dl methylene chloride solution using a Ubbelohde viscometer, and the viscosity-average molecular weight was calculated according to the equation:

$$[\eta]=1.23\times10^{-4}M^{0.83}$$

Color Tone (L/a/b value)

The L, a, b values of a polycarbonate pellet (smaller diameter×larger diameter×length (mm)=2.5×3.3×3.0) were measured by a reflection method using ND-1001DP made by Nippon Denshoku Kogyo, K.K. Larger L value and smaller b value are preferable since the larger the L value is, the higher the brightness is, and the smaller the b value is, the smaller the yellow discoloration is.

Measurement of Nitrogen-containing Basic Compound Contained in Polymerization Reaction Materials To 0.2 g of a reaction mixture dissolved in 10 ml of cyclohexanone, was added 1 ml of an eluting liquid (containing 2.8 mmol of $NaHCO_3$/2.25 mmol of $Na_2CO_3$ of followed by 1 ml of pure water. The mixture was then sufficiently agitated.

After a centrifugal separation was conducted at 3,000 rpm for 15 minutes, water layer obtained was filtered using a filter having a pore size of 0.45 µm, and the amount of a nitrogen-containing basic compound was determined as an ionic compound by the ion chromatography under the following conditions.

| | |
|---|---|
| Type of instrument | Dionex Co., Ltd., 4000I |
| Column | Ionpac CG14/CS14 |
| Eluting liquid | 10 mmol of methane sulfonic acid |
| Regenerating liquid | Pure water |
| Detector | Electroconductivity type |
| Flow rate of eluting liquid | 1 ml/min |
| Suppresser | Autosuppresser (External mode) |

Measurement of Terminal Hydroxyl Group 0.02 g of a sample of was dissolved in 0.4 ml of a deuterated chloroform for the measurement. The terminal hydroxyl group and the terminal phenyl group were measured by using 1H-NMR (Nippon Denshi, K.K., EX-270) at 20° C. The concentration of the terminal hydroxyl group was calculated as follows.

Concentration of terminal hydroxyl group (%)=Number of terminal hydroxyl group/Total number of terminals)×100.

Measurement of Transparency

A 50×50×5 (mm) plate was molded using Neomat N150/75 injection molding madiune made by Sumitomo Jyuki, K.K. with the cylinder temperature of 280° C. and a molding cycle of 3.5 second. The total light transmittance was measured by NDH-Σ80 made by Nippon Denshoku Kogyo, K.K. The higher the total light transmittance is, the better the transparency is.

Quantitative Analysis of Nitrogen Atom Contained in the Impurities of DPC

Determined following the usual method by using DN-1000 microchemical emission spectrometry analyzer made by Dorman Division, Rosemund Analytical.

Analysis of Metallic Elements

A sample was dissolved in an electronic-industry-grade IPA to determine the metallic elements using SPQ9000ICP mass spectrometer made by Seiko Istrumetnts, K.K. by the one-point calibration method.

Analysis of Salicylic Acid Derivative 5 mg of a sample was dissolved in 5 ml of acetonitrile to be analyzed by a high speed liquid chromatography (LC020 made by Toso, K.K.) with a ODS-7 column (Nomura Chemicals, K.K.).

Measurement of Metallic Components

Metallic component of a sample piece was measured using a fluorescent X-ray (XRF-1700, made by Shimazu Seisakusyo, K.K.) with a X-ray source of Rh.

Measurement of the Number of Foreign Materials 10 g of a polymer obtained after the polymerization was dissolved in 500 ml of dichloromethane, and filtered with a Millipore filter having a pore size of 10 µm. Remaining dichloromethane-dissolvable components were washed away after the filtration to leave foreign materials on the filter by separating the dissolvable components. The number of the black foreign materials were counted by a naked eye, while the number of gels were counted under an irradiation of a black light (ultraviolet wave length at 365 nm, made by SPECTROLINE) after drying the filter. In order to compensate for the effect of contamination by foreign materials from the outside environment, similar operation was conducted on a polymer which does not contain foreign materials (filtration treated) and the obtained result was used as a blank value to subtract the value.

Measurement of Weight Amount of Gel State Foreign Material

To a polymer after the polymerization, dichloromethane was added so as to obtain a polymer solution at a concentration of approximately 7 weight %. The solution was filtered with a filter made by Millipore having a pore size of 10 µm. After the filtration, remaining dichloromethane-dissolvable components were washed away to leave gels on the filter by separating the dissolvable components.

The amount of the gel was determined by measuring the weight after drying of the filter after the filtration, and subtracting the weight of a filter which had been treated similarly except that polymer had not been used. To confirm that the foreign materials were gels, the filter was irradiated under the black light (ultraviolet wave length at 365 nm, made by SPECTROLINE) for light emission.

Auger Electron Spectroscopic Analysis of Stainless Alloy Surface

As a measuring device, Auger electron spectrometer, type PH1610 made by Perkin-Elmer was used. The measurements were made under the conditions of an electron beam acceleration voltage of 3 kV, a sample electric current of 100 nA and a tilting angle of 30 degree. Spattering etching conditions were; E=2 keV; argon gas flow; and an etching rate of 3.5 nm/minute or less (indium oxide converted). The thickness of the oxide film layer is estimated regarding as an average interface a place where oxygen occupies about 40 mole % of the total atomic composition.

In the Examples, the evaluations of the physical properties of diphenyl carbonate (DPC) were made by the following method.

Measurement of Weather Resistance 100 g of sample DPC flakes were placed in a transparent glass container and stored under air in a cool dark place of a room for 6 months, shutting the direct sunlight off. Then, Hazen changes of the DPC were measured by comparing them with the Hazen standard colorimetric liquid after keeping them in a molten state at 250° C. for 5 hr using a flat bottom Pyrex colorimetric tube having a diameter of 23 mm and a thickness of 1.5 m with a liquid depth of 140 mm, based on the color number test method shown in JIS K-4101. An aluminum ingot hot bath shown in the JIS K-4101 was used as a melting device and also to keep the molten state.

It is to be noted that, in the description of the present invention, the ratio of the alkali metal compound, the alkaline earth metal compound and the nitrogen-containing basic compound to the charged aromatic dihydroxy compound are expressed by "the W (value) equivalent amount of Z (name of the compound) as the metal or the basic nitrogen based on 1 mole of the aromatic dihydroxy compound." This mean that the amount of Z corresponds to the W mole, if the Z has one sodium atom just like sodium phenoxide and 2,2-bis(4-hydroxyphenyl)propane monosodium salt, or one basic nitrogen just like triethylamine, and the amount of Z corresponds to W/2 mole, if the Z has two sodium atoms just like 2,2-bis(4-hydroxyphenyl)propane disodium salt.

Example 1

To a raw material melting vessel with an agitator of the facilities in which 99.5% of the atmospheric gas in the transporting piping directly before the raw material melting vessel which is to supply aromatic dihydroxy compound powder to the raw material melting vessel was nitrogen gas, the linear velocity was 5 cm/minute, a condenser with the inside temperature kept at 110° C. was attached to the vent of the raw material melting vessel, and the pressure of the gas phase of the raw material melting vessel was controlled at 0 MPa to 0.05 MPa, the 2,2-bis(4-hydroxylphenyl) propane powder and molten diphenyl carbonate are added a at a prescribed ratio of 1 mole of the former to 1.01 mole of the latter. After the complete melting, the molten mixed liquid was transported to a raw material storage vessel kept at 150° C.

Then, the molten mixture was charged continuously at the rate of 60 kg/hour into a vertical type agitation vessel equipped with a rectifying column, the inside temperature being maintained at 240° C. and the inside pressure, at 1333 Pa (10 mmHg), while at the same time $1\times10^{-6}$ equivalent of biphenol A disodium salt and $1\times10^{-4}$ equivalent of tetramethyl ammonium hydroxide (hereinafter abbreviated as TMAH) based on 1 mole of the 2,2-bis(4-hydroxyphenyl) propane were added continuously. The reaction was performed by removing formed phenol through the rectifying column. The obtained reaction material was continuously taken out using a gear pump.

Then, the pre-polymer was supplied continuously to a horizontal type reaction vessel with the inside temperature kept at 270° C. and the inside pressure kept at 133 Pa (1 mmHg). The production was conducted continuously by performing the polymerization while removing the generated phenol to the outside of the system.

The quality of the polycarbonate after 2 days of production was checked. the [η] was 0.35 and the b value was 0.28.

Example 2

The polymerization was conducted similarly to the Example 1 except that the inside temperature of the condenser was kept at 90° C. and the pressure of the gas phase of the raw material melting vessel at 0 MPa to 0.01 MPa.

As a result, the quality of the polycarbonate after 2 days of production as measured was: the [η]; 0.35, and the b value; 0.01.

Example 3

The polymerization was conducted similarly to the Example 1 except that a scrubber was installed instead of the condenser and the pressure of the gas phase of the raw material melting vessel was kept at 0 MPa to 0.01 MPa.

As a result, the quality of the polycarbonate after 2 days of production as measured was: [η]; 0.35, and the b value; (−) 0.05.

Comparative Example 1

The polymerization was conducted similarly to the Example 1 except that neither a scrubber nor a condenser was installed, and the pressure of the gas phase of the raw material melting vessel was not controlled.

As a result, the quality of the polycarbonate after 2 days of production as measured was: [η]; 0.35, and the b value; 2.32. Further, in 10 days after the starting the operation, part of the vent piping of the raw material melting vessel was clogged and the pressure of the gas phase of the raw material melting vessel reached 0.1 MPa or higher while transporting the raw material from the raw material powder vessel to the raw material melting vessel.

Example 4

2,2-bis(4-hydroxyphenyl)propane (BPA) and diphenyl carbonate were charged at a ratio of 1 mole of the former to 1.02 mole of the latter into a melting vessel equipped with an agitator, melted at 150° C. after the atmosphere was replaced with nitrogen and transported to a raw material storage vessel kept at 150° C.

Then the molten mixture was supplied continuously to a vertical type agitation vessel equipped with aectingcolumn, the inside temperature being maintained at 220° C. and the inside pressure, at 13333 Pa (100 mmHg), while $5\times10^{-7}$ equivalent as the metal of sodium phenoxide (hereinafter abbreviated as NPO) and $1\times10^{-4}$ equivalent as the nitrogen-containing basic compound of TMAH based on 1 mole of 2,2-bis(4-hydroxyphenyl)propane were added continuously. The reaction was conducted by removing the produced phenol through the locating column and the obtained reaction material was continuously taken out using a gear pump.

The degree of polymerization of the obtained reaction material was determined by measuring intrinsic viscosity thereof. The intrinsic viscosity [η] was measured as described above. As a result, the reaction mixture (1) had a viscosity-average molecular weight of 1500 and contained 2.7 ppm of TMAH.

The reaction mixture (1) was then continuously supplied to a vertical type agitation vessel with the inside temperature maintained at 250° C. and the inside pressure at 1333 Pa (10 mmHg), and the reaction was conducted by removing the produced phenol through a rectifying column. The obtained reaction mixture was continuously taken out using a gear pump.

As a result, the reaction mixture (2) had a viscosity-average molecular weight of 6500 and contained 0.09 ppm TMAH.

Then the reaction mixture (2) was continuously supplied to a horizontal type single axial reaction vessel with the inside temperature maintained at 270° C. and the inside pressure at 133 Pa (1 mmHg), and further polymerized by removing the produced phenol to the outside of the system to continuously obtain a polycarbonate having a viscosity-average molecular weight of 15,300. The molten state polycarbonate was taken out by a gear pump, then extruded through the dice of a pelletizer to be pelletized. The results are shown in Table 1.

Example 5

The polymerization was conducted to obtain a polycarbonate similarly to the Example 4 except that $5\times10^{-6}$ equivalent as the metal of NPO and $1\times10^{-4}$ equivalent as the nitrogen-containing basic compound of TMAH were added continuously based on 1 mole of 2,2-bis(4-hydroxyphenyl)propane. The results are shown in Table 1.

Example 6

The polymerization was conducted to obtain a polycarbonate similarly to the Example 4 except that $1\times10^{-5}$ equivalent as the metal of NPO and $1\times10^{-4}$ equivalent as the nitrogen-containing basic compound of TMAH were added continuously based on 1 mole of 2,2-bis(4-hydroxyphenyl)propane. The results are shown in Table 1.

Example 7

2,2-bis(4-hydroxyphenyl)propane (BPA) and diphenyl carbonate were charged at a ratio of 1 mole of the former to 1.02 mole of the latter into a melting vessel equipped with an agitator, melted at 150° C. after the atmosphere was replaced with nitrogen and transported to a raw material storage vessel kept at 150° C.

Then, the molten mixture was supplied continuously to a vertical type agitation vessel equipped with a rectifying column, with the inside temperature maintained at 230° C. and the inside pressure at 13333 Pa (100 mmHg), while $5\times10^{-6}$ equivalent as the metal of NPO and $5\times10^{-4}$ equivalent as the nitrogen-containing basic compound of TMAH based on 1 mole of 2,2-bis(4-hydroxyphenyl)propane were added continuously. The reaction was conducted by removing the produced phenol through a rectifying column and the obtained reaction material was continuously taken out using a gear pump to obtain a reaction mixure (1).

Then the reaction mixture (1) was continuously supplied to a vertical type agitation vessel with the inside temperature maintained at 260° C. and the inside pressure at 1333 Pa (10 mmHg), and the reaction was conducted by removing the produced phenol through the rectifying column. The obtained reaction mixture (2) was continuously taken out using a gear pump. Other conditions were maintained similar to those of Example 4. The results are shown in the Table 1.

Example 8

2,2-bis(4-hydroxyphenyl)propane (BPA) and diphenyl carbonate were charged at a ratio of 1 mole of the former to 1.02 mole of the latter into a melting vessel equipped with an agitator, melted at 150° C. after the atmosphere was replaced with nitrogen and transported to a raw material storage vessel kept at 150° C.

Then, the molten mixture was supplied continuously to a vertical type agitation vessel equipped with a rectifying column with the inside temperature maintained at 200° C. and the inside pressure at 13333 Pa (100 mmHg), while $5\times10^{-6}$ equivalent as the metal of NPO and $5\times10^{-5}$ equivalent as the nitrogen-containing basic compound of TMAH based on 1 mole of 2,2-bis(4-hydroxyphenyl)propane were added continuously. The reaction was conducted by removing the produced phenol through the rectifying column and the obtained reaction material was continuously taken out using a gear pump to obtain the reaction mixture (1).

Then, the reaction mixture (1) was continuously supplied to a vertical type agitation vessel with the inside temperature maintained at 245° C. and the inside pressure at 1333 Pa (10 mmHg), and the reaction was conducted by removing the produced phenol through a rectifying column. The obtained reaction mixture (2) was continuously taken out using a gear pump. Other conditions were maintained similar to those of Example 4. The results are shown in the Table 1.

Example 9

2,2-bis(4-hydroxyphenyl)propane (BPA) and diphenyl carbonate were charged at a ratio of 1 mole of the former to 1.02 mole of the latter into a melting vessel equipped with an agitator, melted at 150° C. after the atmosphere was replaced with nitrogen and transported to a raw material storage vessel kept at 150° C.

Then, the molten mixture was supplied continuously to a vertical type agitation vessel equipped with a rectifying column with the inside temperature maintained at 220° C. and the inside pressure at 13333 Pa (100 mmHg), while $5\times10^{-7}$ equivalent as the metal of NPO and $1\times10^{-4}$ equivalent as the nitrogen-containing basic compound of TMAH based on 1 mole of 2,2-bis(4-hydroxyphenyl)propane were added continuously. The reaction was conducted by removing the produced phenol through the rectifying column and the obtained reaction material was continuously taken out using a gear pump to obtain the reaction mixture (1).

Then, the reaction mixture (1) was continuously supplied to a vertical type agitation vessel with the inside temperature maintained at 270° C. and the inside pressure at 2,000 Pa (15 mmHg), and the reaction was conducted by further supplying $1\times10^{-4}$ equivalent as the nitrogen-containing basic compound of TMAH based on 1 mole of 2,2-bis(4-hydroxyphenyl)propane continuously and removing the produced phenol through a rectifying column. The obtained reaction mixture (2) was continuously taken out using a gear pump. Other conditions were maintained similar to those of Example 4. The results are shown in the Table 1.

Comparative Example 2

The polymerization was conducted to obtain a polycarbonate similarly to the Example 4 except that $5\times10^{-6}$ equivalent as the metal of NPO and $5\times10^{-4}$ equivalent as the nitrogen-containing basic compound of TMAH were continuously added based on 1 mole of 2,2-bis(4-hydroxyphenyl)propane. The results are shown in Table 1.

Comparative Example 3

The polymerization was conducted to obtain a polycarbonate similarly to the Example 4 except that $5\times10^{-6}$ equivalent as the metal of NPO and $5\times10^{-5}$ equivalent as the nitrogen-containing basic compound of TMAH were continuously added based on 1 mole of 2,2-bis(4-hydroxyphenyl)propane. The results are shown in Table 1.

Comparative Example 4

2,2-bis(4-hydroxyphenyl)propane (BPA) and diphenyl carbonate were charged at a ratio of 1 mole of the former to 1.02 mole of the latter into a melting vessel equipped with an agitator, melted at 150° C. after the atmosphere was replaced with nitrogen and transported to a raw material storage vessel kept at 150° C.

Then, the molten mixture was supplied continuously to a vertical type agitation vessel equipped with a rectifying column with the inside temperature maintained at 220° C. and the inside pressure at 16,000 Pa (120 mmHg) to obtain the reaction mixture (1). Other conditions were maintained similar to those of Example 4. The results are shown in the Table 1.

Comparative Example 5

2,2-bis(4-hydroxyphenyl)propane (BPA) and diphenyl carbonate were charged at a ratio of 1 mole of the former to 1.02 mole of the latter into a melting vessel equipped with an agitator, melted at 150° C. after the atmosphere was replaced with nitrogen and transported to a raw material storage vessel kept at 150° C.

Then, the molten mixure was supplied continuously to a vertical type agitation vessel equipped with a rectifying column with the inside temperature maintained at 220° C. and the inside pressure at 13333 Pa (100 mmHg), while $5 \times 10^{-7}$ equivalent as the metal of NPO and $1 \times 10^{-4}$ equivalent as the nitrogen-containing basic compound of TMAH based on 1 mole of 2,2-bis(4-hydroxyphenyl)propane were added continuously. The reaction was conducted by removing the produced phenol through the rectifying column and the obtained reaction material was continuously taken out using a gear pump to obtain the reaction mixture (1).

Then, the reaction mixture (1) was continuously supplied to a vertical type agitating vessel with the inside temperature maintained at 270° C. and the inside pressure at 2,000 Pa (15 mmHg), and the reaction was conducted by removing the produced phenol through a rectifying column. The obtained reaction mixture (2) was continuously taken out using a gear pump. Other conditions were maintained similar to those of Example 4. The results are shown in the Table 1.

Example 10

2,2-bis(4-hydroxyphenyl)propane (BPA) and diphenyl carbonate were charged at a ratio of 1 mole of the former to 1.02 mole of the latter into a melting vessel equipped with an agitator and melted at 150° C. after the atmosphere was replaced with nitrogen.

100 kg of the molten mixed liquid was charged at once in a vertical type batch reaction vessel equipped with a rectifying column and an agitator, and $5 \times 10^{-7}$ equivalent as the metal of NPO and $1 \times 10^{-4}$ equivalent as the nitrogen-containing basic compound of TMAH based on 1 mole of 2,2-bis(4-hydroxyphenyl)propane were added. The reaction was conducted by heating up to 200° C. while reducing the pressure to 30 mmHg over 0.5 hour, and keeping this state for 1 hour to distill off most of the phenol. During this period, samples of the reaction mixture were collected successively.

Then, the temperature of the reaction mixture was elevated up to 270° C. while reducing the pressure to 1 mmHg over 0.5 hour and the reaction was continued further for 1 hour to obtain a polycarbonate having a viscosity-average molecular weight of 15,300. The polycarbonate in the molten state was extruded from the dice of a pelletizer to be pelletized. During the progress of the above reaction, samples of the reaction mixture were collected successively. The results of the analysis of each of the samples are shown in Table 2.

Comparative Example 6

2,2-bis(4-hydroxyphenyl)propane (BPA) and diphenyl carbonate were charged at a ratio of 1 mole of the former to 1.02 mole of the latter into a melting vessel equipped with an agitator and melted at 150° C. after the atmosphere was replaced with nitrogen.

100 kg of the molten mixed liquid was charged at once in a vertical type batch reaction vessel equipped with a rectifying column and an agitator, and $5 \times 10^{-7}$ equivalent as the metal of NPO and $1 \times 10^{-4}$ equivalent as the nitrogen-containing basic compound of TMAH based on 1 mole of 2,2-bis(4-hydroxyphenyl)propane were added. The reaction was conducted by heating up to 200° C. while reducing the pressure to 100 mmHg over 0.5 hour, then further reducing the pressure to 30 mmHg over another 0.5 hour and keeping this state for 1 hour to distill off most of the phenol. During this period, samples of the reaction mixture were collected successively.

Then, the temperature of the reaction mixture was elevated up to 270° C. while reducing the pressure to 10 mmHg over 0.5 hour, then further reducing the pressure to 1 mmHg over another 0.5 hour, and the reaction was continued further for 1 hour to obtain a polycarbonate having a viscosity-average molecular weight of 15,300. The polycarbonate in the molten state was extruded from the dice of a pelletizer to be palletized. During the progress of the above reaction, samples of the reaction mixture were collected successively. The results of the analysis of each of the samples are shown in Table 2.

Example 11

115 parts by weight of diphenyl carbonate, 123 parts by weight of bisphenol A and a catalyst solution obtained by dissolving $1.5 \times 10^{-4}$ parts by weight of bisphenol A disodium salt and $4.9 \times 10^{-2}$ parts by weight of tetramethylammonium hydroxide as ester interchange catalysts in 2.0 parts by weight of phenol recycled from the melt polycondensation reaction, containing 10 ppm of methylamine and 50 ppm of anisole, were charged into a reaction vessel equipped with an agitator, a distillation column, a condenser and an evacuation port and melted at 140° C. after the atmosphere was replaced with nitrogen. After agitating for 30 minutes, the inside temperature was elevated up to 180° C. while reducing the pressure to 100 Torr over 15 minutes to distill off the generated phenol. The inside temperature was then elevated up to 200° C. while reducing pressure gradually to 50 Torr over 20 minutes while distilling phenol off. Further, the temperature and the pressure were changed to 220° C. and 30 Torr, then 240° C. and 10 Torr, and then up to 270° C.C and 10 Torr. Finally the reaction was conducted at 270° C. under 1 Torr for 2 hours.

The intrinsic viscosity ($\eta sp/C$) of the obtained polymer measured at 20° C. in methylene chloride was 0.49 dl/g. The hue of the polymer was evaluated, by injection molding a 3 mm thick plate and measuring the b value indicating the yellowness of the polymer using Color and Color Difference Meter ND-1001DP made by Nippon Denshoku Kogyo, K.K. to give a b value of 2.5. The sample did not give an impression of yellowing to the naked eye.

Example 12

The same process was employed as that of the Example 11 except that the recycled phenol used contained 20 ppm of trimethylamine. As a result, the intrinsic viscosity ($\eta sp/C$) of the obtained polymer was 0.50 dl/g, and the b value was 2.6. The sample did not give an impression of yellowing to the naked eye.

Example 13

The same process was employed as that of the Example 11 except that the recycled phenol used contained 15 ppm of anisole. As a result, the intrinsic viscosity (ηsp/C) of the obtained polymer was 0.49 dl/g, and the b value was 2.7. The sample did not give an impression of yellowing to the naked eye.

Comparative Example 7

The same process was employed as that of the Example 11 except that the recycled phenol used contained 150 ppm of trimethylamine and 2,000 ppm of anisole. As a result, the intrinsic viscosity (ηsp/C) of the obtained polymer was 0.45 dl/g, and the b value was 3.1. The sample gave a strong impression of yellowing to the naked eye.

Comparative Example 8

The same process was employed as that of the Example 11 except that the recycled phenol used contained 0.5 ppm of trimethylamine and 0.1 ppm of anisole. As a result, the intrinsic viscosity (ηsp/C) of the obtained polymer was 0.48 dl/g, and the b value was 3.2. The sample gave a strong impression of yellowing to the naked eye.

Example 14
(Purification of DPC:DPC 1 to 11)

To 1 kg of DPC purchased from Bayer Co., Ltd. dissolved in a 5 L of an industrial grade xylene was added 20 g of a hydrotalcite made by Kyowa Chemical, K.K. to be made contact with each other under a nitrogen flow at 100° C. for 5 hours with agitation. The mixture was concentrated to be one third of the original volume by distilling the solvent off with a vacuum evaporator and then cooled by ice to precipitate DPC, which was then dried in vacuum. The obtained DPC was dissolved in 5 l of acetone and the solution was passed through a column packed with 1 kg of an H type strongly acidic cation exchange resin and then through a column packed with 1 kg of an OH type strongly basic anion exchange resin.

The obtained DPC solution after addition of 100 g of an activated carbon was boiled for 30 minutes under a nitrogen flow. After cooling, the solvent was distilled off by a vacuum evaporator. The obtained DPC was fractionated using an Auldershow type full automatic precise distillation device having a theoretical plate number of 10 at a reduced pressure of 100 mmHg to collect a main fraction by removing each 10 volume % of the front and rear fractions. The impurities contained in the raw material and purified DPC's are shown in Tables 3 and 4. In Table 4, (Comp.) means comparative example.

Examples 15 to 19 and Comparative Examples 9 to 11

228 parts by weight of bisphenol A (BPA), 220 parts by weight of a prescribed DPC and prescribed amounts of the ester interchange catalysts were charged in a reaction vessel equipped with an agitating device, a rectifying column, and a pressure reduction device, and melted at 140° C. after the atmosphere was replaced with nitrogen. After agitating for 30 minutes, the inside temperature was elevated to 180° C. and the reaction was conducted under the inside pressure of 100 mmHg for 30 minutes, distilling the produced phenol off.

Then, the inside temperature was elevated to 200° C., while reducing the pressure gradually to 50 mmHg over 30 minutes, distilling the phenol off to progress the reaction. Further the temperature and pressure were gradually changed to 220° C. and 30 mmHg where the reaction was conducted further for 30 minutes under the same conditions. The reaction was further continued by repeating the same procedure changing the temperature the pressure to 240° C. and 10 mmHg, then up to 260° C. and 1 mmHg. Finally, the polycondensation of the polycarbonate was continued at 270° C., while sampling portions of the polymer to measure the molecular weight. The polycondensation was continued until the molecular weight reached 15,300 and 25,100.

After the completion of the polymerization, the concentration of OH group was measured and the terminal groups were blocked by using o-methoxycarbonylphenyl phenylcarbonate. The o-methoxyphenyl phenylcarbonate was used in an equi-molar amount to that of the terminal OH groups. Then $1.75\times10^{-4}$ parts weight ($3\times10^{-6}$ equivalent/1 mol of BPA) of dodecylbenzene sulfonic acid tetrabutylphophonium salt was added to inactivate the catalysts. In the case when the amount of sodium catalyst was changed, three times the amount in mole was used for the inactivation.

The physical properties such as intrinsic viscosity, hue, transparency and flowing property of the polymers at the completion of the polycondensation are shown in the following Tables 5 and 6.

As shown in the above results, if the amounts of the impurities exceed the prescribed ranges, the b value exceeds 7.0 so that the polymers are no longer applicable to use. If the amounts of the impurities exceed the prescribed ranges the transparency was also reduced to an 80% level.

Examples 22, 23 and Comparative Example 12

Into a 1 L separable flask (equipped with an agitating blade, a distillation column and a vent for reducing pressure) made of SUS 316 stainless alloy having, as basic components, 66.6 weight % of iron, 12.4 weight % of nickel and 16.6 weight % of chromium, and comprising niobium and vanadium in the amounts shown in the following Table 7, 228.31 g (1.0 mole) of bisphenol A, 224.93 g (1.05 mole) of diphenyl carbonate, and disodium salt of bisphenol A ($1\times10^{-7}$ mole) and tetramethylammonium hydroxide ($1\times10^{-5}$ mole) as catalysts, from all of which foreign materials had been removed beforehand, were charged under a dust-free condition to start the ester interchange reaction. After melting at 200° C., the reaction was conducted under 100 mmHg for 1 hour, removing the distilled phenol off. After being kept at 220° C. under 30 mmHg for 30 minutes, the reaction mixture was kept at 240° C. under 30 mmg for 30 minutes, then at 260° C. under 10 mmHg for 30 minutes to remove the produced phenol by distillation.

Further, the polycondensation of the polymer was progressed at 280° C. under 1 mmHg or less for another about one hour to complete the reaction when the intrinsic viscosity of the polycarbonate resin reached approximately 0.35. The obtained polymer was taken out under a dust-free condition.

The number of foreign materials in the obtained polymer was counted by the above mentioned method. The obtained results are shown in the Table 7.

Example 24

The whole inside surface of a 1 L separable flask made of a SUS 316 having, as basis components, 61.9 weight % of iron, 10.1 weight % of nickel and 17.4 weight % of chromium, was polished with a buff (#300), and degreased with heptane. The flask was heated at 330° C. for 62 hours in air. A result of the Auger electron spectroscopic analysis of a similarly treated test piece for analysis (test piece having a diameter of 10 mm and a thickness of 1 mm) is shown in FIG. 1. As a result of the measurement, it was found that the surface oxide film layer having a thickness of 45 nm consisting mainly of iron oxide was formed on the surface.

To the reaction facilities using the above flask as a polymerization vessel equipped with a 20 cm long distillation column and a 50 cm long air cooling type condenser, and an agitation blade made of the same material similarly treated, 228.31 g (1.0 mole) of bisphenol A, 224.93 g (1.05 mole) of diphenyl carbonate, and $1.0 \times 10^{-6}$ mole of sodium salt of phenol and $1.0 \times 10^{-4}$ mole of tetramethylammonium acetate were charged, then melted at 200° C. The reaction was conducted by reducing the pressure to 100 mmHg for 1 hour while distilling the aromatic hydroxy compound produced by the reaction off. Further, the reaction was continued at 220° C. under 30 mmHg for 30 minutes, at 240° C. under 30 mmHg for 30 minutes and then at 260° C. under 30 mmHg for 30 minutes.

The reaction was continued at 260° C. under 1.0 mmHg for 3 hours, and the reaction was completed when the intrinsic viscosity [η] of the polymer reached 0.45. All of the obtained polymer was dissolved in dichloromethane, and the amount of the gel state foreign materials contained in the solution was measured. As a result, the amount of the gel state foreign materials was 9 mg per 1 kg of the polymer.

Example 25

A 1 L separable flask (buff-polished and degreased) made of SUS 316 similar to that used in the Example 24, was treated in refluxing 3% aqueous nitric acid solution for 2 hours, washed with water, then dried and heated at 300° C. for 24 hours in air. As a result of the Auger electron spectroscopic analysis of a similarly treated test piece for analysis, it was found that the surface oxide film layer formed consisted of mainly iron oxide and chromium oxide, the thickness being 21 nm.

Polymerization was conducted in the same way as in the Example 24, using the flask as the polymerization vessel to measure the gel state foreign materials. As a result, the amount of the gel state foreign materials was 11 mg per 1 kg of the polymer.

Example 26

A 1 L separable flask (buff-polished and degreased) made of SUS 304 similar to that used in the Example 24 was heated at 500° C. for 1 hours in air. A similarly treated test piece for analysis was subjected to the Auger electron spectroscopic analysis. The oxide film layer formed having a thickness of approximately 100 nm consisted mainly of iron oxide.

Polymerization was conducted similarly to the Example 24, using the flask as the polymerization vessel to measure the amount of the gel state foreign materials. As a result, the amount of the gel state foreign materials was 8 mg per 1 kg of the polymer.

Comparative Example 13

A 1 L separable flask (buff-polished and degreased) made of SUS 316 similar to that used in the Example 24 was used without any treatment. As a result of the Auger electron spectroscopic analysis of a similar test piece for analysis, it was found that the thickness of the surface film layer was 5 nm.

Polymerization was conducted similarly to the Example 24, using the flask as the polymerization vessel to measure the amount of the gel state foreign materials. As a result, the amount of the gel state foreign materials was 83 mg per 1 kg of the polymer.

Comparative Example 14

A 1 L separable flask (buff-polished and degreased) made of SUS 304 similar to that used in the Example 24 was heated at 300° C. for 1 hours in air. As a result of the Auger electron spectroscopic analysis of the similarly treated test piece for analysis, it was found that the thickness of the surface film layer was 15 nm.

Polymerization was conducted similarly to the Example 24, using the flask as the polymerization vessel to measure the amount of the gel state foreign materials. As a result, the amount of the gel state foreign materials was 65 mg per 1 kg of the polymer.

Examples 27-1 to 3 and Comparative Examples 15-1 to 3

In the production of a polycarbonate using polymerization facilities composed of a SUS 316 made melting vessel having an inner volume of 3 L equipped with an agitator, a first and a second two vertical reaction vessels each made of SUS 316, having an inner volume of 1 L and equipped with a rectifying column and an agitator, and a horizontal type single axial reaction vessel which are all connected to each other by gear pumps, 2,2-bis(4-hydroxyphenyl)propane (BPA) and diphenyl carbonate (DPC) purified in the Example 14 were charged at a ratio of 1 mole of the former to 1.02 mole of the latter into the above melting vessel kept at 150° C. and under a nitrogen atmosphere and melted. The molten mixture was supplied continuously to the first vertical reaction vessel kept at the inside temperature of 220° C., under an inside pressure of 100 mmHg, while $5 \times 10^{-7}$ equivalent as Na element of NaOH and $1 \times 10^{-4}$ equivalent as the nitrogen-containing basic compound of tetramethylammonium hydroxide (TMAH based on 1 mole of BPA which were dissolved in a high purity phenol were added as a solution continuously. The reaction was conducted by removing the produced phenol through the rectifying column, while sampling as appropriate from the obtained reaction material, and the reaction material was supplied continuously to the second reaction vessel by a gear pump.

The degrees of polymerization; the viscosity-average molecular weights, and the amounts of TMAH of the samples taken out were measured similarly to the Example 4.

The reaction of the reaction material was continued in the second vertical reaction vessel kept at the inner temperature of 250° C. and the inner pressure of 10 mmHg by removing the produced phenol through the rectifying column, while sampling as appropriate from the obtained reaction material, and the reaction material was supplied continuously to the horizontal type reaction vessel by a gear pump.

The degrees of polymerization; the viscosity-average molecular weights, and the amounts of TAHH of the samples taken out were measured similarly to the Example 4.

Then the polymerization of the reaction material was continued in the horizontal type single axial reaction vessel with the inner temperature kept at 270° C. and the inner pressure at 1 mm Hg, removing the produced phenol through the rectifying column for progressing the polymerization to continuously obtain the polycarbonate having a viscosity-average molecular weight of 15,300. The molten state polycarbonate was taken out by a gear pump, extruded from a dice of a pelletizer to be pelletized.

The conditions and results are shown in Table 8.

It is to be noted that among the results in the Tables 8 to 10, the values of the hue shown in brackets in the Examples 27 and 28 are those at 7th day after the start of the operation, while the values in the Example 27 and afterwards, and in the Comparative Example 15 and afterwards other than the above are the values of stable samples taken 24 hours after the start of the operation.

Example 28

3 L of the phenol generated in the above polymerization was distilled under an atmospheric pressure by a distillation apparatus equipped with a 30 cm widmer distillation column to obtain 2 L of a main fraction by removing 0.5 L of the front fraction. The phenol obtained had an anisole content of 50 ppm and a trimethylamine content of 10 ppm.

$2 \times 10^{-2}$ parts by weight of NaOH and 9.1 parts by weight of TMAH was dissolved in the above phenol to make $1 \times 10^3$ parts by weight of a catalyst solution. Using the catalyst solution, the reaction was conducted and the analyses were carried out, similarly to the Example 27-1. The results are shown in Table 8.

Comparative Example 16-1

The components of the SUS 316 of the reaction facility used in the Example 27 were the same as those in the Comparative Example 12 and their basic composition was; Fe, 66.6 weight %, Ni, 12.4 weight % and Cr, 16.6 weight %; and the contents of Nb and V, 10 ppm or less. Using this reaction facility, the reaction in the Example 27-1 was continued for 7 days, and the samples taken at 1st, 3rd and 7th days were examined for the numbers of the foreign materials per 10 g of polycarbonate. Also, the amounts of the gel state foreign materials (the weight of the foreign materials (mg) per 1 kg of the polycarbonate) described in the Example 24, were measured.

The catalyst solution applied was prepared using an industrial grade pure phenol (anisole and trimethylamine contents not detected by GC or an ion chromatography; 0.1 ppm or less). The results are shown in Table 9.

Example 29-1

The reaction was conducted in the same way as was conducted in the Example 16-1 using the same reaction facilities as were used in Example 22 which was SUS 316 having Nb, 100 ppm and V, 600 ppm. The obtained polymer was similarly analyzed. The results are shown in the Table 9.

Example 29-2

By treating the reaction facilities having the same material quality as that used in the Example 29-1 in a similar way to the Example 25 to form 21 nm of a iron oxide and chromium oxide layer. Using the reacting facilities, the reaction and the analysis were conducted under the same conditions as of the Example 29-1. The obtained results are shown in the Table 9.

Comparative Example 16-2

Using the same reaction facilities in the Example 29-2 and DPC-6 shown in the Example 14, the reaction and the analysis were conducted under the same conditions as of the Comparative Example 16-1. The obtained results are shown in the Table 9.

Example 30-1

Using the catalyst solution prepared in the Example 28, the reaction and the analysis were conducted similarly to the ample 29-1. The obtained results are shown in the Table 9.

Example 30-2

Using the catalyst solution prepared in the Example 28, the reaction and the analysis were conducted similarly to the Example 29-2. The obtained results are shown in the Table 9.

From the results of the above Examples, it can be understood that the generation of the foreign materials can be suppressed by the selection of the material quality and the formation of the surface oxide layer, that the suppression of the foreign materials, especially for a long period of continued reaction, can be achieved by use of "the suppression of the impurities in DPC" together with "the selection of the material quality of the reaction facilities" and "the formation of the surface oxide layer", and that, though the effect of the catalyst solution is rather minor as an effect, it gives unexpectedly a definite effect on reducing the amount of the gel.

Example 31-1

In the facilities wherein 99.5% of the atmospheric gas in the transporting piping directly before a raw material melting vessel which is to supply a powdery aromatic dihydroxy compound to the raw material melting vessel was nitrogen gas, the linear velocity was 5 cm/minute, a condenser with the inside temperature kept at 110° C. was installed at the vent of the raw material melting vessel and the pressure of the gas phase of the raw material melting vessel was controlled at 0 mPa to 0.05 MPa, the powdery 2,2-bis(4-hydroxylphenyl)propane and molten diphenyl carbonate purified in the Example 14 are charged at a prescribed ratio of 1 mole of the former to 1.02 mole of the latter into the melting vessel equipped with an agitator, and the obtained molten mixed liquid, after complete melting, was transported to a raw material storage vessel kept at 150° C.

Then the reaction and analysis were conducted similarly to the Example 4. The obtained results of the kinds of the used DPC, the conditions of the first and second vertical reaction vessels, the viscosity-average molecular weights and the TMAH contents of the reaction materials (1) and (2) and the physical properties of the polymers, are shown in Table 10.

The above reaction facilities have the same material quality as that of the Example 22, being made of SUS 316 containing Nb, 100 ppm and V, 600 ppm. The catalysts were added as a high purity phenol solution.

Comparative Example 17-1

The reaction and analysis were carried out similarly to the Example 31-1 employing the reaction conditions described in the Table 10. The obtained results are shown in the Table 10.

Comparative Example 17-2

The reaction and analysis were carried out similarly to the Example 31-1 except that a condenser was not installed and the pressure of the gas phase was not controlled. The obtained results are shown in the Table 10.

Example 31-2

The catalyst solution was prepared using phenols prepared in the Example 28 and the reaction and analysis were carried out similarly to the Example 31-1. The obtained results are shown in the Table 10.

Example 31-3

The reaction and analysis were carried out similarly to the Example 31-2 with the reaction facilities treated similarly to the Example 25 to form 21 nm of an iron oxide and chromium oxide layer. The obtained results are shown in the Table 10.

TABLE 1

| | Amount of addition | | Reaction mixture (1) | | Reaction mixture (2) | | Produced polycarbonate | |
| --- | --- | --- | --- | --- | --- | --- | --- | --- |
| | NPO *1 | TMAH *2 | Visc.-average molecular weight | TMAH *3 | Visc.-average molecular weight | TMAH *3 | Visc.-average molecular weight | COL, b |
| Example 4 | $5 \times 10^{-7}$ | $1 \times 10^{-4}$ | 1500 | 2.70 | 6500 | 0.09 | 15300 | −0.9 |
| Example 5 | $5 \times 10^{-6}$ | $1 \times 10^{-4}$ | 1500 | 3.80 | 6700 | 0.31 | 15300 | −0.5 |
| Example 6 | $1 \times 10^{-5}$ | $1 \times 10^{-4}$ | 1500 | 5.00 | 6800 | 0.49 | 15300 | 0 |
| Example 7 | $5 \times 10^{-6}$ | $5 \times 10^{-4}$ | 1700 | 9.40 | 6700 | 0.97 | 15400 | −0.1 |
| Example 8 | $5 \times 10^{-6}$ | $5 \times 10^{-5}$ | 1400 | 0.20 | 6700 | 0.01 | 15300 | −0.1 |
| Example 9 | $5 \times 10^{-7}$ | $1 \times 10^{-4}$ | 1500 | 2.70 | 6600 | 0.08 | 15300 | −0.7 |
| Co. example 2 | $5 \times 10^{-6}$ | $5 \times 10^{-4}$ | 1600 | 14.0 | 6700 | 1.90 | 15200 | 0.9 |
| Co. example 3 | $5 \times 10^{-6}$ | $5 \times 10^{-5}$ | 1400 | 0.08 | 6400 | 0.007 | 15400 | 0.7 |
| Co. example 4 | $5 \times 10^{-7}$ | $1 \times 10^{-4}$ | 1300 | 13.0 | 6100 | 1.20 | 15300 | 0.7 |
| Co. example 5 | $5 \times 10^{-7}$ | $1 \times 10^{-4}$ | 1500 | 2.70 | 6600 | 0.002 | 15300 | 0.8 |

Note:
*1; Sodium phenoxide (Equivalent as metal/1 mole BPA)
*2; Tetramethylammonium hydroxide (Equivalent as basic nitrogen/1 mole BPA)
*3; TMAH (ppm)

TABLE 2

| | Adding amount | | Reaction mixture | | Produced polycarbonate | |
| --- | --- | --- | --- | --- | --- | --- |
| | NPO *1 | TMAH *2 | Vic.-average molecular weight | TMAH *3 | Vic.-average molecular weight | COL, b |
| Example 10 | $5 \times 10^{-7}$ | $1 \times 10^{-4}$ | 600 | 7.20 | 15300 | −0.5 |
| | | | 1800 | 2.90 | | |
| | | | 2800 | 0.60 | | |
| | | | 3100 | 0.17 | | |
| | | | 4500 | 0.11 | | |
| | | | 7200 | 0.07 | | |
| | | | 9600 | 0.02 | | |
| Comparative Example 6 | $5 \times 10^{-7}$ | $1 \times 10^{-4}$ | 700 | 14.0 | 15300 | 1.1 |
| | | | 1700 | 11.0 | | |
| | | | 2900 | 4.01 | | |
| | | | 3300 | 2.74 | | |
| | | | 4700 | 1.26 | | |
| | | | 7600 | 0.73 | | |
| | | | 9300 | 0.29 | | |

Note:
*1; Sodium phenoxide (Equivalent as metal/1 mole BPA)
*2; Tetramethylammonium hydroxide (Equivalent as basic nitrogen/1 mole BPA)
*3: TMAH (ppm)

TABLE 3

| Name of sample | Nitrogen content ppm | Fe content ppm | Ti content ppm | Sn content ppm | Cr content ppm | Total of heavy metals ppm | Salicylic acid derivative ppm | DPC weather resistance, Hazen-Molten |
| --- | --- | --- | --- | --- | --- | --- | --- | --- |
| Raw material DPC | 10 | 0.3 | 0.2 | 0.1 | 0.2 | 0.8 | 15 | 20 |
| Purified DPC | 1 or less | 0.1 or less | 0.1 or less | 0.1 or less | 0.1 or less | 0.1 or less | 1 or less | 0 to 5 |

TABLE 4

| DPC sample | Impurities Nitrogen content, ppm | Impurities Total metal content ppm | Impurities Salicylic acid derivative, ppm | Weather resistance of DPC, Hazen-Molten* | Number of samples having Hazen-Molten of ≧20* | Comment |
|---|---|---|---|---|---|---|
| DPC-1 | 1 | 0.1 or less | 1 or less | 0 to 5 | 0 | Effect of nitrogen content |
| DPC-2 | 4 | 0.1 or less | 1 or less | 0 to 5 | 0 | |
| DPC-3 | 5 | 0.1 or less | 1 or less | 0 to 5 | 0 | |
| DPC-4 (Comp.) | 10 | 0.1 or less | 1 or less | 0 to 30 | 1 | |
| DPC-5 | 4 | 0.1 or less | 1 or less | 0 to 5 | 0 | Effect of metal content |
| DPC-6 (Comp.) | 4 | 0.7 | 1 or less | 0 to 20 | 1 | |
| DPC-7 | 5 | 0.2 | 1 or less | 5 to 10 | 0 | |
| DPC-8 (Comp.) | 5 | 0.7 | 1 or less | 5 to 25 | 3 | |
| DPC-9 | 5 | 0.2 | 10 | 5 to 10 | 0 | Effect of salicylic acid derivative |
| DPC-10 (Comp.) | 5 | 0.2 | 15 | 5 to 20 | 2 | |
| DPC-11 (Comp.) | 5 | 0.2 | 20 | 5 to 25 | 4 | |

*(Number of measured samples/lot: n = 10)

TABLE 5

| | Effect of nitrogen content | | | Effect of metal content | |
|---|---|---|---|---|---|
| | Example-15 | Example-16 | Example-9 | Example-17 | Example-10 |
| 1) Kind of DPC | DPC-1 | DPC-3 | DPC-4 | DPC-5 | DPC-6 |
| 2) Catalyst | | | | | |
| Kind of alkali metal (× $10^{-6}$ eq./BPA) | NaOH 1 | NaOH 2 | NaOH 2 | NaOH 2 | NaOH 1 |
| Kind of basic nitrogen compd. (× $10^{-6}$ eq./BPA) | TMAH 100 | TMAH 200 | TMAH 200 | TMAH 200 | TMAH 100 |
| 3) Terminal blocking | | | | | |
| OH group conc. before blocking (mole %) | 45 | 45 | 45 | 45 | 45 |
| OH group conc. after blocking (mole %) | 3 | 3 | 3 | 3 | 3 |
| 4) Polymer Physical prperties | | | | | |
| Degree of polymerization (Molecular wt.) | 15300 | 15300 | 15300 | 25100 | 25100 |
| Hue; L/a/b | 64/2.5/4.0 | 65/2.0/4.0 | 61/2.5/8.5 | 65/2.0/3.5 | 59/2.0/8.0 |
| Tranparency (%) | 90.1 | 09.1 | 88.0 | 90.1 | 89.0 |
| Flow property | Good | Good | Bad | Good | Slightly bad |

TABLE 6

| | Effect of salicylic acid derivative content | | |
|---|---|---|---|
| | Example-18 | Example-19 | Comparative example-11 |
| 1) Kind of DPC | DPC-9 | DPC-9 | DPC-10 |
| 2) Catalyst | | | |
| Kind of alkali metal (×$10^{-6}$ eq./BPA) | NaOH 1 | NaOH 0.5 | NaOH 1 |
| Kind of basic nitrogen compd. (×$10^{-6}$ eq./BPA) | TMAH 100 | TMAH 100 | TMAH 100 |
| 3) Terminal blocking | | | |
| Conc. of OH group before blocking (mole %) | 45 | 45 | |
| Conc. of OH group after blocking (mole %) | 3 | 3 | 3 |
| 4) Polymer physical properties | | | |
| Intrinsic viscosity [η] | 25100 | 25100 | 25100 |
| Hue; L/a/b | 62/2.5/3.5 | 67/2.0/2.5 | 61/2.5/7.0 |
| Transparency (%) | 90.1 | 90.1 | 88.0 |
| Flow property | Good | Good | Bad |

TABLE 7

|  | Example 22 | Example 23 | Comparative example 12 |
|---|---|---|---|
| Metal content (ppm) | | | |
| Niobium | 100 | 200 | <10 |
| Vandium | 600 | 300 | <10 |
| Degree of polymerization of Polymer (η) | 0.374 | 0.366 | 0.378 |
| Number of foreign materials | | | |
| Black foreign materials | 7 | 8 | 15 |
| Gel state foreign materials | 18 | 20 | 120 |

TABLE 8

| Example Number | Kinds of DPC | Cat. (amt.) × $10^{-6}$ eq./BPA (NaOH) | Cat. (amt.) × $10^{-6}$ eq./BPA (TMAH) | 1st Reactor Visc. ave. moelcular weight | 1st Reactor TMAH amount (ppm) | 2nd Reactor, Vis. ave. molecular weight | 2nd Reactor, TMAH amount (ppm) | Visc. ave. molecular weight | Polymer hue L/a/b | Polymer transparency (%) | Polymer flow property |
|---|---|---|---|---|---|---|---|---|---|---|---|
| 27-1 | DPC-1 | 0.5 | 100 | 1500 | 2.7 | 6500 | 0.09 | 15300 | 65/−2.0/−1.2 (65/−2.0/−1.0) | 90.1 | Good |
| 27-2 | DPC-3 | 0.5 | 100 | 1500 | 2.8 | 6600 | 0.9 | 15300 | 65/−1.5/−0.9 | 0.1 | Good |
| Com. 15-1 | DPC-4 | 0.5 | 100 | 1500 | 4.5 | 6600 | 2.1 | 15300 | 64/0.5/2.2 | 89 | Slt. bad |
| Com. 15-2 | DPC-6 | 0.5 | 100 | 1500 | 3.0 | 6500 | 1.4 | 15300 | 64/0.1/1.5 | 88 | Slt. bad |
| Com. 15-3 | DPC-10 | 0.5 | 100 | 1500 | 3.0 | 6500 | 1.8 | 15300 | 63/1.1/2.0 | 88 | Slt. bad |
| 27-3 | DPC-3 | 5 | 100 | 1500 | 2.9 | 6800 | 0.2 | 15300 | 65/−1.5/−0.1 | 90.1 | Good |
| 28 | DPC-1 | 0.5 | 100 | 1500 | 2.7 | 6500 | 0.09 | 15300 | 65/−2.2/−1.3 (65/−2.0/−1.2) | 90.1 | Good |

(Note) Com. in example number means Comparative example.

TABLE 9

| Example No. | Kind of DPC | Cat. (amt.) × $10^{-6}$ eq./BPA (NaOH) | Cat. (amt.) × $10^{-6}$ eq./BPA (TMAH) | Viscosity-average molecular weight | Polymer hue L/a/b | Number/amount of polymer of foreign materials (number/10 g PC)/amount of gel state foreign material (mg/1 kg PC) 1st day | 3rd day | 7th day |
|---|---|---|---|---|---|---|---|---|
| CE16-1 | DPC-1 | 0.5 | 100 | 15300 | 65/−2.0/−1.2 | 7/85/65 | 20/150/90 | 55/300 or more/250 |
| 29-1 | DPC-1 | 0.5 | 100 | 15300 | 65/−2.0/−1.2 | 5/13/11 | 7/18/15 | 20/35/30 |
| 29-2 | DPC-1 | 0.5 | 100 | 15300 | 65/−2.0/−1.3 | 3/7/6 | 3/10/7 | 5/15/12 |
| CE16-2 | DPC-6 | 0.5 | 100 | 15300 | 64/0.1/1.5 | 5/21/15 | 34/120/85 | 61/300 or more/265 |
| 30-1 | DPC-1 | 0.5 | 100 | 15300 | 65/0.1/−1.2 | 5/10/10 | 7/11/11 | 20/25/25 |
| 30-2 | DPC-1 | 0.5 | 100 | 15300 | 65/−2.0/−1.3 | 3/5/6 | 3/8/7 | 5/10/8 |

(Note) Number/amount of polymer foreign materials means number of black foreign materials (number/10 g PC)/number of gel state foreign materials (number/10 g PC)/gel state foreign materials (mg/1 kg PC).
(Note) CE in example number means comparative example.

TABLE 10

| Example No. | Kind of DPC | Catalyst (amount) × $10^{-6}$ eq./BPA (NPO) | Catalyst (amount) × $10^{-6}$ eq./BPA (TMAH) | 1st Reactor [Temp (° C.)/Pressure (mmHg)] | Vis. aver. moleculae wt. of rect. mixture (1)/TMAH content (ppm) | 2nd Reactor [Temp (° C.)/Pressure (mmHg)] | Vis. aver. moleculae wt. of rect. mixture (2)/TMAH content (ppm) | Horizontal monoaxial reactor [Temp (° C.)/Pressure (mmHg)] |
|---|---|---|---|---|---|---|---|---|
| 31-1 | DPC-1 | 0.5 | 100 | 220/100 | 1500/2.7 | 250/10 | 6500/0.09 | 270/1 |
| CE17-1 | DPC-4 | 0.5 | 100 | 220/100 | 1500/4.5 | 250/10 | 6500/1.4 | 270/1 |
| CE17-2 | DPC-1 | 0.5 | 100 | 220/100 | 1500/2.7 | 250/10 | 6500/0.09 | 270/1 |
| 31-2 | DPC-1 | 0.5 | 100 | 200/100 | 1500/2.7 | 250/10 | 6500/0.09 | 270/1 |
| 31-3 | DPC-1 | 0.5 | 100 | 200/100 | 1500/2.7 | 250/10 | 6500/0.09 | 270/1 |

|  | Degree of polymerization | Polymer hue |
|---|---|---|

TABLE 10-continued

| Example No. | (viscosity average molecular weight) | (L-value) 1st day, 2nd day, 7th day | Polymer transparency 7th day |
|---|---|---|---|
| 31-1 | 15300 | −1.2/−1.0/−1.0 | 90.1 |
| CE17-1 | 15300 | 1.5/1.6/1.8 | 88 |
| CE17-2 | 15300 | −1.0/−0.8/2.1 | 90 |
| 31-2 | 15300 | −1.2/−1.2/−1.1 | 90.1 |
| 31-3 | 15300 | −1.2/−1.2/−1.2 | 90.1 |

(Note) CE in example number means comparative example

What is claimed is:

1. A method for producing a polycarbonate which comprises
   a) supplying an aromatic dihydroxy compound powder and a carbonic acid diester into a raw material melting vessel through a transportation piping positioned directly before said raw material melting vessel wherein 90 volume % or more of atmospheric gas in the transportation piping is a non-oxidizing gas and wherein a linear velocity thereof is 0.5 cm/min. or higher;
   b) mixing and melting said aromatic dihydroxy compound powder and carbonic acid diester;
   c) followed by initiating a melt polymerization reaction in the presence or absence of a catalyst,
      wherein pressure of a gas phase of the raw material melting vessel is kept at 0 MPa to 0.05 MPa as gauge pressure.

2. A method for producing a polycarbonate as described in claim 1, wherein a vent piping of the raw material melting vessel is connected to a scrubber.

3. A method for producing a polycarbonate as described in claim 1 or 2, wherein a vent piping of the raw material melting vessel is connected to a condenser kept at a temperature of 70° C. or higher.

4. A method for producing a polycarbonate as described in claim 1, wherein the carbonic acid diester is diphenyl carbonate.

5. A method for producing an aromatic polycarbonate comprising reacting a mixture consisting mainly of an aromatic dihydroxy compound and a carbonic acid diester by an ester interchange reaction using an alkali metal compound and/or an alkaline earth metal compound, and a nitrogen-containing basic compound as a catalyst, wherein the resulting reaction mixture has a viscosity-average molecular weight, and wherein a concentration of the nitrogen-containing basic compound in the reaction mixture is kept in a range of not less than 0.1 ppm and not more than 10 ppm during a period in which the viscosity-average molecular weight of the mixture is between 500 and 3,000, and not less than 0.01 ppm and not more than 1 ppm during a period in which the viscosity-average molecular weight of the reaction mixture is between 3,000 and 10,000.

6. A method for producing an aromatic polycarbonate as described in claim 5, wherein $10^{-3}$ to $10^{-8}$ equivalent as an alkali metal of the alkali metal compound and/or as an alkaline earth metal of the alkaline earth metal compound is used based on 1 mole of the aromatic dihydroxy compound.

7. A method for producing an aromatic polycarbonate as described in claim 5, wherein $5 \times 10^{-6}$ to $1 \times 10^{-8}$ equivalent as an alkali metal of the alkali metal compound and/or as an alkali earth metal of the alkaline earth metal compound is used based on 1 mol of the aromatic dihydroxy compound.

8. A method for producing an aromatic polycarbonate as described in any one of claims 5 to 7, wherein the nitrogen-containing basic compound is expressed by formula (1); wherein $R_1$ is an alkyl group having a carbon number of 1 to 4 or an aryl group having a carbon number of 6 to 12

$$(R_1)_4NOH \qquad (1).$$

9. A method for producing an aromatic polycarbonate as described in any one of the above claims 5 to 7, wherein the aromatic dihydroxy compound is 2,2-bis(4-hydroxyphenyl) propane, and the carbonic acid diester is diphenyl carbonate.

10. A method for producing an aromatic polycarbonate by a melt polycondensation reaction using a carbonic acid diester as a raw material, wherein a monohydroxy compound produced as a byproduct of the melt polycondensation reaction is recycled to be used as a solvent for adding a catalyst, and wherein the solvent for adding the catalyst comprises not less than 1 ppm and not more than 1,000 ppm of anisole.

11. A method for producing of an aromatic polycarbonate by a melt polycondensation reaction using a carbonic acid diester as a raw material, wherein a monohydroxy compound produced as a byproduct of the melt polycondensation reaction is recycled to be used as a solvent for adding a the catalyst, and wherein the solvent for adding the catalyst containing not less than 1 ppm and not more than 100 ppm of trimethylamine.

12. A method for producing an aromatic polycarbonate by a melt polycondensation reaction using a carbonic acid diester as a raw material, wherein a monohydroxy compound produced as a byproduct of the melt polycondensation reaction is recycled to be used as a solvent for adding a catalyst, and wherein the solvent for adding the catalyst comprises not less than 1 ppm and not more than 1,000 ppm of anisole and not less than 1 ppm and not more than 100 ppm of trimethylamine.

13. A method for producing an aromatic polycarbonate as described in any one of claims 10 to 12, wherein the monohydroxy compound is phenol.

14. A method for producing an aromatic polycarbonate as described in any of the above claims 10 to 12, wherein the catalyst used in the melt polycondensation reaction is a member selected from the group consisting of a quaternary ammonium salt, a quaternary phosphonium salt, an alkali metal salt, an alkali earth metal salt, a combination of a quaternary ammonium salt and an alkali metal salt, and a combination of a quaternary phosphonium salt and an alkaline metal salt and a combination of a quaternary phosphonium salt and an alkaline earth metal salt.

15. A carbonic acid diester excellent in storing stability and suitable for producing an aromatic polycarbonate by heat-melting an aromatic dihydroxy compound and a carbonic acid diester in the presence of a catalyst comprising a member selected from the group consisting of an alkali metal compound, an alkali earth metal compound and a combination thereof to perform the ester interchange reaction, wherein the diester comprises not more than 5 ppm based on the nitrogen atom of a nitrogen-containing compound, not more than 0.5 ppm of each of the metalelements contained therein and not more than 10 ppm of a salicylic acid derivative.

16. A carbonic acid diester as described in the above claim 15, wherein said metal elements comprises at least one metal selected from the group consisting of iron, tin, chromium, titanium and copper and wherein the total amount of iron, tin, chromium, titanium and copper is 0.5 ppm or less.

17. A carbonic acid diester as described in either one of claims 15 or 16, wherein a total amount of all metals is 0.5 ppm or less.

18. A method for producing an aromatic polycarbonate by heat-melting an aromatic dihydroxy compound and a carbonic acid diester in the presence of a catalyst comprising a member selected from the group consisting of an alkali metal compound, an alkaline earth metal compound, and a combination thereof to perform an ester interchange reaction, wherein as the carbonic acid diester, a carbonic acid diester excellent in storing stability and suitable for producing an aromatic polycarbonate by heat-melting an aromatic dihydroxy compound and a carbonic acid diester is used, and wherein the catalyst comprises $5.0 \times 10^{-8}$ to $5.0 \times 10^{-6}$ equivalent as an alkali metal of the alkali metal compound and/or as an alkaline earth metal of the alkaline earth metal compound and $1.0 \times 10^{-5}$ to $5.0 \times 10^{-4}$ equivalent as a nitrogen atom of a nitrogen-containing basic compound.

19. A method for producing of an aromatic polycarbonate with suppressed generation of a foreign material, which comprises performing an ester interchange reaction of an aromatic dihydroxy compound and a carbonic acid diester in a reaction facility, wherein the material quality of the reaction facility comprises a stainless alloy, and wherein the stainless alloy comprises a total content of niobium and/or vanadium from 10 ppm to 1,000 ppm.

20. A method for producing an aromatic as described in claim 19, wherein a catalyst used for the ester interchange reaction comprises an alkali metal compound and/or a nitrogen-containing basic compound, wherein the amount of the alkali metal compound used is $1 \times 10^{-8}$ to $5 \times 10^{-6}$ moles based on 1 mole of the aromatic dihydroxy compound.

21. A production facility for an aromatic polycarbonate, having an oxide layer, said oxide layer comprising iron oxide as a main component and having a thickness of at least 20 nm or more formed on the inner wall surface of the reaction facility.

22. A production facility for an aromatic polycarbonate as described in claim 21, wherein said inner wall surface of the reaction facility is made of a stainless steel alloy.

23. A production facility for an aromatic polycarbonate as described in claim 21, wherein the oxide layer further comprises chromium oxide as a component.

24. A production facility for an aromatic polycarbonate as described in claim 21, wherein an aromatic polycarbonate is produced by an ester interchange reaction of an aromatic dihydroxy compound and a carbonic acid diester in the presence of a catalyst.

25. A method for producing an aromatic polycarbonate by an ester interchange reaction of an aromatic dihydroxy compound and a carbonic acid diester in the presence of a catalyst, wherein production is carried out in a reaction facility comprising an oxide layer on an inner wall surface of the reaction facility, wherein said oxide layer comprises iron oxide as a main component and has a thickness of at least 20 nm.

26. A method for producing an aromatic polycarbonate comprising reacting a mixture consisting mainly of an aromatic dihydroxy compound and a carbonic acid diester by an ester interchange reaction using an alkali metal compound and/or an alkaline earth metal compound, and a nitrogen-containing basic compound as a catalyst, wherein the carbonic acid diester comprises not more than 5 ppm based on the nitrogen atom of a nitrogen-containing compound, not more than 0.5 ppm of each metal contained therein and not more than 10 ppm of salicylic acid derivative, and wherein the reaction mixture during or after the reaction has a viscosity-average molecular weight, and wherein a concentration of the nitrogen-containing basic compound in the reaction mixture is kept in a range of not less than 0.1 ppm and not more than 10 ppm during a period in which the viscosity-average molecular weight of the reaction mixture is between 500 and 3,000, and not less than 0.01 ppm and not more than 1 ppm during a period in which the viscosity-average molecular weight of the reaction mixture is between 3,000 and 10,000.

27. A method for producing an aromatic polycarbonate as described in claim 26, wherein $5 \times 10^{-6}$ to $1 \times 10^{-8}$ equivalent as an alkali metal of the alkali metal compound and/or as an alkali earth metal of the alkaline earth metal compound is used based on 1 mol of the aromatic dihydroxy compound.

28. A method for producing an aromatic polycarbonate as described in claim 26, wherein the reaction is performed in a reaction facility comprising stainless steel, said stainless steel comprising a total content of niobium and/or vanadium from 10 ppm to 1,000 ppm.

29. A method for producing an aromatic polycarbonate as described in claim 26, wherein the reaction is performed in a reaction facility having an oxide layer, said oxide layer comprising iron oxide as a main component and having a thickness of at least 20 nm or more formed on the inner wall surface of the reaction facility.

30. A method for producing an aromatic polycarbonate as described in claim 1, wherein the melt polymerization reaction is conducted in the presence of a catalyst comprising an alkali metal compound and/or an alkali earth metal compound, and a nitrogen-containing basic compound, wherein the carbonic acid diester comprises not more than 5 ppm based on the nitrogen atom of a nitrogen-containing compound, not more than 0.5 ppm of each metal contained therein and not more than 10 ppm of a salicylic acid derivative, and wherein the reaction mixture during or after the reaction has a viscosity-average molecular weight, and wherein a concentration of the nitrogen-containing basic compound in the reaction mixture is kept in a range of not less than 0.1 ppm and not more than 10 ppm during a period in which the viscosity-average molecular weight of the reaction mixture is between 500 and 3,000, and not less than 0.01 ppm and not more than 1 ppm during a period in which the viscosity-average molecular weight of the reaction mixture is between 3,000 and 10,000.

31. A method for producing an aromatic polycarbonate as described in claim 26, wherein a monohydroxy compound produced as a byproduct of the melt polycondensation reaction is recycled to be used as a solvent for adding the catalyst, and wherein the solvent for adding the catalyst comprises not less than 1 ppm and not more than 1,000 ppm of anisole.

32. A method for producing an aromatic polycarbonate described in claim 31, wherein the monohydroxy compound is phenol.

* * * * *